US012559329B2

(12) United States Patent
Pedrazzini

(10) Patent No.: US 12,559,329 B2
(45) Date of Patent: Feb. 24, 2026

(54) SYSTEM FOR HANDLING BIOLOGICAL TISSUE SAMPLES

(71) Applicant: Inpeco SA, Novazzano (CH)

(72) Inventor: Gianandrea Pedrazzini, Paradiso (CH)

(73) Assignee: Inpeco SA, Novazzano (CH)

( * ) Notice: Subject to any disclaimer, the term of this patent is extended or adjusted under 35 U.S.C. 154(b) by 895 days.

(21) Appl. No.: 17/722,731

(22) Filed: Apr. 18, 2022

(65) Prior Publication Data

US 2022/0332525 A1      Oct. 20, 2022

(30) Foreign Application Priority Data

Apr. 19, 2021   (IT) ......................... 102021000009788

(51) Int. Cl.

| | |
|---|---|
| *B65G 54/02* | (2006.01) |
| *G01N 1/31* | (2006.01) |
| *G01N 35/00* | (2006.01) |
| *G01N 35/02* | (2006.01) |
| *G01N 35/04* | (2006.01) |

(52) U.S. Cl.
CPC ............... *B65G 54/02* (2013.01); *G01N 1/31* (2013.01); *G01N 35/00584* (2013.01); *G01N 35/00732* (2013.01); *G01N 35/021* (2013.01); *G01N 35/04* (2013.01); *B65G 2201/0235* (2013.01); *G01N 2035/0465* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 7,424,340 B2 * | 9/2008 | Owens | ................... B65G 51/46 |
| | | | 406/182 |
| 2006/0148063 A1 * | 7/2006 | Fauzzi | ..................... G01N 1/31 |
| | | | 422/65 |

(Continued)

FOREIGN PATENT DOCUMENTS

| | | | | |
|---|---|---|---|---|
| CN | 101918848 A | * | 12/2010 | ....... G01N 35/00732 |
| EP | 2 472 265 A2 | * | 4/2012 | |

OTHER PUBLICATIONS

European Search Report dated Dec. 9, 2021. 3 pages.

*Primary Examiner* — Jill A Warden
*Assistant Examiner* — Velvet Elizabeth Heron
(74) *Attorney, Agent, or Firm* — RMCK Law Group PLC

(57)      ABSTRACT

A process and system for handling biological tissue samples through work stations in which at least one work station includes a plurality of independent work locations. The handling system includes a main transport apparatus operatively connected to input and output stations and to the work stations for moving bidirectionally the samples among these; a plurality of secondary transport apparatuses operatively connected to the main transport apparatus and each respectively operatively connected to independent work locations of one of the work stations and configured to move bidirectionally the samples among these; and a control arrangement of the transport apparatuses for managing routing and handling of the samples in the work stations according to a work protocol associated with the samples and for managing routing and handling of the samples in the work locations according to a workload of the work locations and the work protocol associated with the samples.

16 Claims, 8 Drawing Sheets

(52) U.S. Cl.
CPC ................ *G01N 2035/0477* (2013.01); *G01N 2035/0481* (2013.01); *G01N 2035/0491* (2013.01)

(56) References Cited

U.S. PATENT DOCUMENTS

| 2007/0173972 | A1* | 7/2007 | Owens | .................. | B65G 51/32 |
| | | | | | 700/232 |
| 2014/0188545 | A1 | 7/2014 | Chirica et al. | | |
| 2014/0308661 | A1* | 10/2014 | Holmes | ............. | G01N 35/0092 |
| | | | | | 435/6.1 |
| 2016/0363605 | A1 | 12/2016 | Liepold | | |
| 2018/0143215 | A1 | 5/2018 | Chang et al. | | |

* cited by examiner

101

201

301

311

101

321

303

302

500

SYSTEM FOR HANDLING BIOLOGICAL TISSUE SAMPLES

CROSS-REFERENCE TO RELATED APPLICATION

This application claims priority to Italian Patent Application No. 102021000009788 filed Apr. 19, 2021. The disclosure of the above application is incorporated herein by reference in its entirety.

BACKGROUND OF THE INVENTION

The present invention relates to a system for handling biological tissue samples, for example of cassettes and slides for anatomical pathology. In particular, the present invention relates to a handling system through a plurality of work stations of an anatomical pathology laboratory which comprises such system.

In the following description reference will be made, for the sake of brevity, to biological tissue samples without the present invention having to lose in generality with respect to all biological samples falling within the scope of anatomical pathology. Such biological tissue samples may include, for example, cytological, biopsy and surgical samples.

The study of tissue samples for diagnostic purposes as part of the anatomical pathology specialty requires macroscopic and microscopic examination of the aforementioned biological samples collected from patients. For the definition of a correct examination and the related diagnosis, the biological tissue samples must undergo numerous processing steps that define the anatomical pathology process and allow its evaluation at the cellular level. These processing steps, commonly performed within anatomical pathology laboratories, include collection of biological tissue samples, treatment of the aforementioned samples, preparation of appropriate microscope slides, staining and microscopic examination. As part of the treatment of a sample, further steps may be necessary. Similarly, each described macrophase can be carried out using different techniques and technologies depending on the required exam and the desired result.

The diagnostic study of tissue samples in the field of anatomical pathology also requires the involvement of a plurality of actors, including pathologists and anatomical pathology laboratory technicians, interested in one or more of the macro-phases previously described. These subjects contribute to the complexity of the necessary operations, increasing the problems related to the correct handling and identification of biological tissue samples, as well as to the definition of a correct diagnostic procedure. Furthermore, the conservation of tissue samples becomes a priority in order to guarantee a correct and complete diagnosis, but their custody over time equally becomes a priority to fulfill any possible patient requests for further analyses or clinical needs. To this end, it is also important to ensure the traceability of the tissue samples from the moment of collection and during the aforementioned processing steps, up to their archiving to avoid errors due to lack of or incorrect identification as well as due to loss. The traceability, conservation and custody of tissue samples may involve slides equipped with microtomy samples, paraffin tissue blocks or formalin samples.

The critical points in this process related to the diagnostic study, conservation and custody of tissue samples concern in particular the transport of tissue samples and their traceability during the various processing steps.

The aforementioned problems become particularly relevant as the volume of daily treated biological tissue samples increases. The increase in volume contributes, in fact, to the significant intrinsic increase in errors to which the various actors may be subject. The increase in volume of tissue samples also produces an increase in discrepancies in the steps to which the samples are submitted as part of the anatomical pathology diagnostic process. For example, in the context of the staining macro-phase, the increase in the volume of tissue samples may involve the need to submit different samples to different types, or protocols, of staining, considerably increasing the complexity in the management of similar but different processes.

A further problem concerns the type of workflow in the steps that define the anatomical pathology process. Since all tissue samples must be processed in each processing step, the result is a linear workflow standard that does not consider the workloads resulting from the times required in each step. Similarly, the linear workflow does not consider any eventual protocol differences to which some samples may be subjected in a specific processing step or after the recovery of partially processed samples from the warehouse.

Part of the errors due to the manipulation of biological tissue samples by operators have been eliminated through the use of automatic instruments shared within the anatomical pathology laboratory. Resuming the example of the staining macro-phase, this is usually carried out through the use of automated staining instruments, while the laboratory technician is only entrusted with the mere loading and unloading operations, leaving to the instruments the complex task of obtaining an effective and uniform staining, which correctly applies the required staining protocol.

Despite the use of automated instruments, numerous steps of management or processing of biological tissue samples are in any case managed, by necessity or will, by the subjects involved in the diagnostic process. One of the most expensive management steps, in terms of time and error, carried out by the aforementioned subjects is the management of transport, for example between the different shared instruments within the anatomical pathology laboratory. To overcome this problem, the use of transport automation in anatomical pathology laboratories is known.

Document EP2472265 B1 describes an equipment to be used in an anatomical pathology laboratory. This includes at least a staining module and a slide mounting module, an imaging module, a storage module and, finally, an automated transport module that allows the handling of biological samples, mounted on suitable slides, through the aforementioned instruments. The solution described in the aforementioned prior art document therefore allows the minimization of the manual management of the handling through the instruments in the various processing steps. This solution, although moving in the direction of reducing errors due to the manual management of tissue samples, is not suitable for the management of workflows that provide for the application of different protocols to different samples, furthermore comprising only a part of the operations, and related modules, which can be used in an anatomical pathology laboratory and therefore not the entire process. Similarly, this solution is not able to optimize the throughput of the system in the event of work peaks in one of the integrated modules precisely because, not being able to manage the entire process ongoing in the laboratory but only a part, it cannot have total control over the workflow of samples throughout the entire system, particularly by not contemplating the interface with the input and output points of the samples from the system itself.

It would therefore be desirable to have a system for handling biological tissue samples able to minimize the above-described drawbacks. In particular, it would be desirable to have a system for handling biological tissue samples able to optimize the workflow within an anatomical pathology laboratory, reorganizing it and making it more efficient according to the changing working conditions that may occur.

It would also be desirable to have a system for handling biological tissue samples able to realize the traceability of the aforementioned biological tissue samples during the processing steps within an anatomical pathology laboratory, minimizing manual interaction for the realization of the handling.

Document US 2014/188545 A1 describes a system according to the preamble of claim 1. This document illustrates a computer system that follows the workflow of biological tissue samples in an anatomical pathology laboratory, providing the operator with real-time information on the process status of each sample through the visualization of a virtual laboratory. Such document does not contain any teaching in relation to the handling of biological tissue samples through the different stations and/or locations of an anatomical pathology laboratory, in order to submit the samples to the various steps of the work protocol.

Document US 2018/143215 A1 describes an analyzer device for performing chemical and/or biochemical tests on fluid biological samples contained in cartridges which are automatically moved towards the cells defined in the structure of the device. This known solution concerns the handling of cartridges within a unique specific analyzer device and not the handling of biological samples through different work stations of an anatomical pathology laboratory.

OBJECT OF THE INVENTION

Object of the present invention is to provide a system for handling biological tissue samples able to minimize the above described drawbacks. In particular, object of the present invention is to provide a system for handling biological tissue samples of the modular and flexible type, i.e. able to adapt to different conditions and loads with a reduced number of modifications.

Another object of the present invention is to provide a system for handling biological tissue samples able to maintain the traceability of the biological tissue sample along all the process steps and the entire sample workflow, and not just for a segment of the same. In this way, it is possible to achieve a total integration in terms of traceability within a laboratory, therefore not only limited to the areas strictly used for anatomical pathology operations but also extended to the input and output points of the samples from the system.

Not least object is to provide a system able to handle biological tissue samples using any type of container suitable for being used for such handling.

SUMMARY OF THE INVENTION

In order to achieve one or more of the aforementioned objects, the invention relates to a system for handling biological tissue samples through a plurality of work stations of an anatomical pathology laboratory, wherein each biological tissue sample is associated with a unique code that identifies the biological tissue sample and is indicative of a work protocol, comprising a succession of steps of an anatomical pathology process, to be carried out on the biological tissue sample, in which at least one of said work stations comprises a plurality of independent work locations, said handling system comprising:

an input station for entering said biological tissue samples into said handling system; and an output station for the exit of said biological tissue samples from said handling system;

said system being characterized in that it further comprises:

one or more transport apparatuses operatively connected to said input station, to said output station, to said work stations and to said work locations and able to move bidirectionally said biological tissue samples to said input station, to said output station, to said work stations and to said independent work locations;

control means of said transport apparatuses, comprising one or more electronic controllers configured to manage, by means of said transport apparatuses, the routing and handling of said biological tissue samples in said work stations according to the work protocol associated with said biological tissue samples, defining a path through said work stations for each of said biological tissue samples and wherein said electronic controllers are configured to manage, by means of said transport apparatuses, the routing and handling of said biological tissue samples in said work locations according to the workload of said work locations and to the work protocol associated with said biological tissue samples identifying one of said work locations for each biological tissue sample, and wherein said electronic controllers are configured to move forward, by means of said transport apparatuses, each biological tissue sample along said defined path, through said work stations, when the downstream station in said defined path is free to process said biological tissue sample and wherein said electronic controllers are configured to move forward said biological tissue sample to the identified work location when the identified work location is free to process said biological tissue sample.

Further preferred features of the system according to the invention are indicated in the attached claims which form an integral part of this description.

BRIEF DESCRIPTION OF THE DRAWINGS

Further features and advantages of the present invention will become evident from the description of preferred embodiments, illustrated by way of non-limiting example in the attached figures, in which.

DETAILED DESCRIPTION OF PREFERRED EMBODIMENTS

Figure 1:
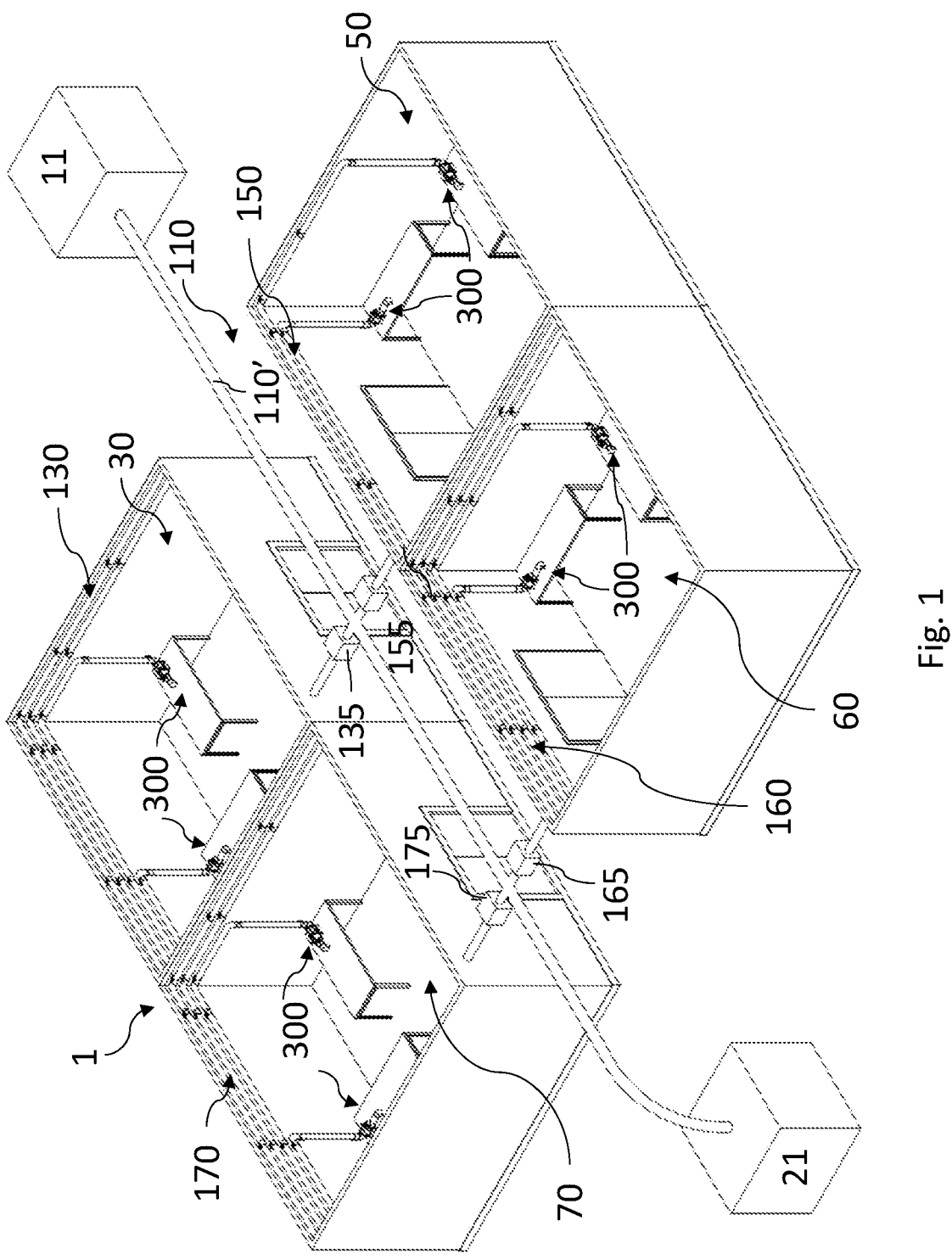
FIG. 1 is a perspective view of a first embodiment of the anatomical pathology laboratory and the related handling system, according to the present invention.
Figure 2:
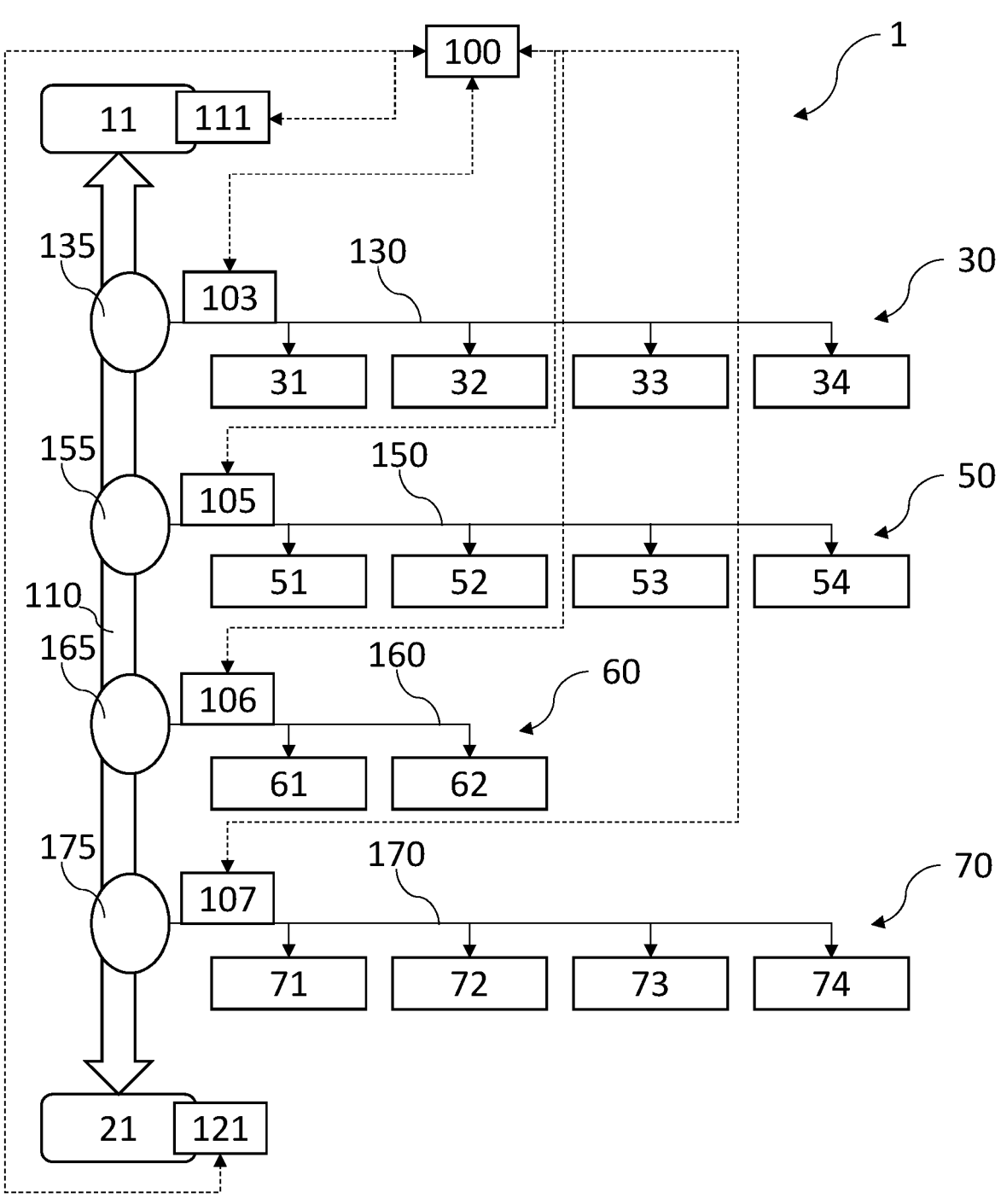
FIG. 2 is a schematic block view of the first embodiment of the anatomical pathology laboratory and the related handling system of FIG. 1, wherein the control system is of the distributed architecture type at the work stations.
Figure 3A:
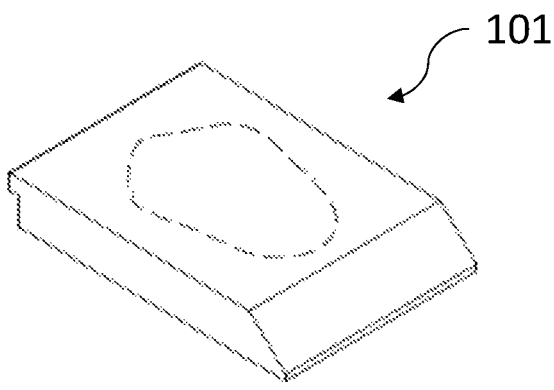
FIG. 3A is a perspective view of a cassette containing a biological tissue sample.
Figure 3B:
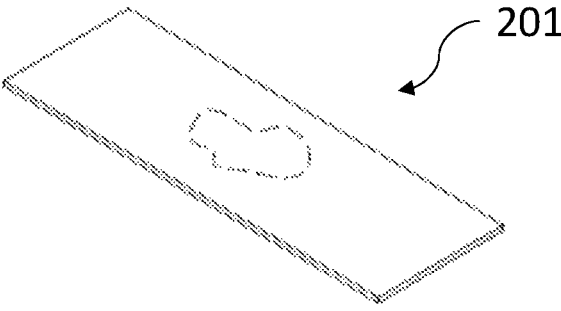
FIG. 3B is a perspective view of a slide containing a biological tissue sample.

With reference to FIGS. 1 and 2, it is illustrated by way of example an anatomical pathology laboratory 1, comprising a plurality of work stations, in particular a processing station 30, a microtomy station 50, a staining station 60 and a microscopic analysis station 70. As illustrated by way of example in FIG. 1, the plurality of work stations provided for the anatomical pathology laboratory 1 can be divided by means of a plurality of sectors, or compartments, separated from each other and each suitable to host a single work station. Similarly, the single stations could be identified within a common work area even without the need for partition walls or dedicated compartments. In this sense, the number of work stations of the laboratory 1 can vary according to the size of the laboratory, and include other types of stations related to all the working steps of the anatomical pathology process.

Each of the aforementioned work stations 30, 50, 60, 70 is provided with a plurality of work locations, each provided with automated, semi-automated or manual instruments for use by the operators. These work locations are independent from each other, i.e. there is no correlation between the workload carried out in one work location with the workload carried out in the work locations of the same work station. This results in work locations performing operations which are the same or alternative, but not sequential, in the same work station.

In the present invention, the term workload means the evaluation for each work location of the number of biological tissue samples assigned to it and/or of the estimated average time and/or of the number of operations to be carried out for a specific step or procedure of the work protocol on biological tissue samples, as described in greater detail below. For example, the workload of the work locations connected to the processing station 30 is determined by the number of cassettes 101 containing a biological tissue sample to be processed in each station, possibly in combination with the average processing time (in batch or single). Similarly, the workload of the work locations connected to the microtomy station 50 can be determined by the number of cassettes 101 containing a biological tissue sample to be cut and by the number of slides 201 containing a biological tissue sample to be obtained for each of said cassettes 101. Furthermore, the workload of the works locations connected to the staining station 60 can be determined by the number of slides 201 containing a biological tissue sample to be stained, possibly in combination with the average staining time (in batch or single). Finally, the workload of the work locations connected to the microscopic analysis station 70 can be determined by the number of slides 201 containing a biological tissue sample to be subjected to microscopic analysis, possibly in combination with the average time for carrying out a microscopic analysis.

It is understood that cassettes 101 and slides 201 represent only one of the possible embodiments of containers for the transport of biological tissue samples along the system object of the invention, being able to include any other type of container suitable for such purpose.

In the preferred embodiment illustrated in FIG. 2, the processing station 30 comprises four work locations 31, 32, 33, 34 defined by as many automated processing modules. The microtomy station 50 comprises four work locations 51, 52, 53, 54 defined by as many semiautomatic microtomes. The staining station 60 comprises two work locations 61, 62 defined by as many automatic stainers, both or alternatively intended for "normal" or "special" staining. Finally, the analysis station 70 comprises four work locations 71, 72, 73, 74 defined by as many manual microscopes used for interpretation by pathologists.

Further, laboratory 1 comprises an input station 11 and an output station 21 of biological tissue samples, described in greater detail below.

The laboratory could comprise a different number of work stations and/or work locations, according to the needs of the working cycle and the type of steps to be performed, without this altering the inventive concept of the present invention.

The handling of the biological tissue samples in the laboratory 1 is obtained by means of a handling system of biological tissue samples according to the present invention. The latter is able to handle the aforementioned samples automatically and ensure their traceability. In particular, the anatomical pathology laboratory 1 comprises a handling system of biological tissue samples able to move the biological tissue samples to the plurality of previously described work stations 30, 50, 60, 70. Moreover, the handling system is further able to move the biological tissue samples even to the different independent work locations of each work station, as described in detail below.

The handling system according to the present invention is provided with two transport apparatuses operationally connected to each other, although separated from an operative point of view.

A main transport apparatus 110 of the handling system is operatively connected to the work stations 30, 50, 60, 70 and able to bidirectionally move the biological tissue samples to the same work stations 30, 50, 60, 70. To allow the entry, as well as the exit, of biological tissue samples from the main transport apparatus 110, the latter is further respectively connected to the input station 11 and to the output station 21, both elements of the handling system, allowing also in this case a bidirectional handling of the samples and the re-entry into the working cycle of biological tissue samples already treated in a specific work location or temporarily stored.

FIGS. 1 and 2 show the first embodiment of the handling system according to the present invention. The main transport apparatus 110 is of the pneumatic pipe type, i.e. able to handle the aforementioned biological tissue samples within one or more main pipes to the work stations. The propulsion of the containers therefore takes place through the use of compressed air or vacuum generated by pumps within the transport pipe, or transport pipes in case of cutting of the pipe. According to what is illustrated in greater detail in FIG. 1, the main transport apparatus 110 comprises a main pipe 110', able to directly connect in a bidirectional way the input station 11 and the output station 21, and a plurality of diverter devices 135, 155, 165, 175 arranged on the main pipe 110' of the main transport apparatus 110 at each of secondary transport apparatuses 130, 150, 160, 170. In this way, the diverter devices 135, 155, 165, 175 are able to, respectively, indirectly connect the work stations 30, 50, 60, 70 to the main transport apparatus 110. The diverter devices 135, 155, 165, 175 will not be further described in detail, as they can correspond in their construction details to any known diverter device that can be used in pneumatic pipe apparatuses.

A secondary transport apparatus of the handling system is provided in each of the work stations 30, 50, 60, 70, wherein each secondary transport apparatus is operatively connected to all the work locations of the served work station only, such as to allow the bidirectional handling of biological tissue samples to the aforementioned independent work locations. In addition, each secondary transport apparatus is operatively connected to the main transport apparatus 110, thus allowing the re-entry into the working cycle of biological tissue samples treated in a specific independent work location of a specific work station.

With reference to the preferred embodiment illustrated in FIGS. 1 and 2, the handling system comprises a secondary transport apparatus 130 for the processing station 30, a secondary transport apparatus 150 for the microtomy station 50, a secondary transport apparatus 160 for the staining station 60 and a secondary transport apparatus 170 for the microscopic analysis station 70. The secondary transport apparatus 130 is operatively connected to the work locations 31, 32, 33, 34 of the aforementioned processing station 30 and is able to handle the biological tissue samples, in particular cassettes 101 containing a biological tissue sample to be processed, at the aforementioned work locations 31, 32, 33, 34 and at the main transport apparatus 110. The secondary transport apparatus 150 is operatively connected to the work locations 51, 52, 53, 54 of the aforementioned microtomy station 50 and able to handle the biological tissue samples, in particular cassettes 101 containing a biological tissue sample to be to sectioned and/or slides 201 containing a biological tissue sample deriving from the aforementioned sections, at the aforementioned work locations 51, 52, 53, 54 and at the main transport apparatus 110. The secondary transport apparatus 160 operatively connects the work locations 61, 62 of the staining station 60, handling the biological tissue samples, in particular slides 201 containing a biological tissue sample to be stained, at the aforementioned work locations 61, 62 and at the main transport apparatus 110. Finally, the secondary transport apparatus 170 is able to operatively connect the work locations 71, 72, 73, 74 and to handle the biological tissue samples, in particular the stained slides 201, at the aforementioned work locations 71, 72, 73, 74 and at the main transport apparatus 110. The number of secondary transport apparatuses can vary according to the number of work stations provided within the anatomical pathology laboratory, being these secondary handling apparatuses independent of each other and able to perform handling exclusively within a single work station.

Preferably, the secondary transport apparatuses 130, 150, 160, 170 are made with the same technology used for the main transport apparatus, i.e. of the pneumatic pipe type. Therefore, the biological tissue samples are handled at the work locations 31, 32, 33, 34, 51, 52, 53, 54, 61, 62, 71, 72, 73, 74 of one of the work stations 30, 50, 60, 70 within one or more secondary pipes which define a network of circular section pneumatic mail pipes, branched in such a way as to allow the connection with all the provided work locations.

The structure of each secondary transport apparatus 130, 150, 160, 170, illustrated in greater detail in FIG. 1 in the preferred embodiment, is realized by means of a plurality of separate pipes which branch off from the main transport apparatus 110 towards each served work station 30, 50, 60, 70, advantageously travelling along the walls of the compartments intended for each work station in such a way as not to hinder the movements of the operators of the anatomical pathology laboratory 1. It follows that the processing station 30, the microtomy station 50 and the microscopic analysis station 70 are each respectively provided with four pipes while the staining station 60 is provided with two pipes, in which each pipe is intended for a specific work location. In particular, each group of pipes of a same work station connects to the related diverter device 135, 155, 165, 175 arranged on the main transport apparatus 110. Therefore, in this configuration each location is provided with its serving pipe, thus allowing the parallelization of the transport within the reference work station to the plurality of work locations arranged inside it. In this case, the diverter device 135, 155, 165, 175 provided for each secondary transport apparatus 130, 150, 160, 170 at the main transport apparatus 110 allows the deviation within all the pipes of the related secondary transport apparatus 130, 150, 160, 170. Consequently, the routing of the biological tissue sample must be defined at most in correspondence with such diverter devices 135, 155, 165, 175. Such structure of the handling system therefore allows to connect in a bidirectional way each of the work locations of one of the work stations directly to the main transport apparatus 110.

Figure 4A:
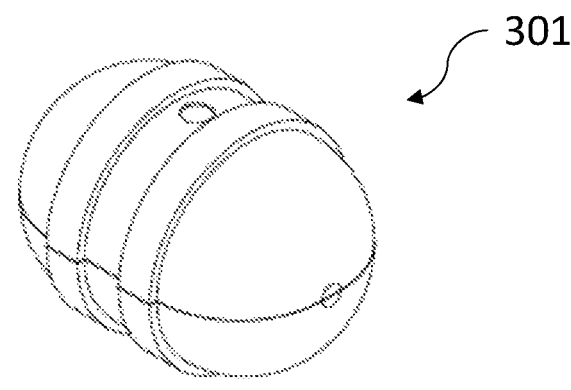
FIG. 4A is a perspective view of a closed configuration capsule, according to the present invention.
Figure 4B:
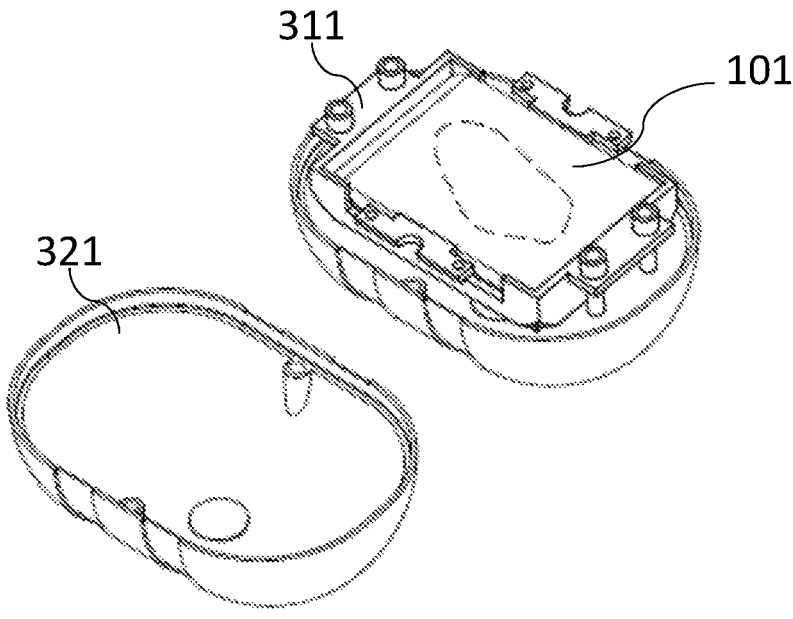
FIG. 4B is a perspective view of the capsule of FIG. 4A in an open configuration.

The structural solution related to the handling of the biological tissue sample by means of pneumatic pipes is also implemented through the use of a special container for said biological tissue samples, in particular by a capsule 301 with a mainly circular section and preferably an ovoid shape. The capsule 301 is, therefore, a special container used in an apparatus of the pneumatic handling type and able to move within the pipes of which this apparatus is constituted by means of compressed air or the vacuum generated by pumps within the transport pipe, or the transport pipes in case of cutting. The use of the capsule 301, illustrated in greater detail in FIGS. 4A and 4B, allows the optimal handling within the pneumatic pipes by exploiting the pressure or depression of the air generated on the walls of the capsule itself, which obstruct its free passage. The shape of the capsule can be such as to ensure the transport of one or more biological tissue sample containers, in particular one or more biological tissue sample cassettes or slides. In particular, the capsule 301 according to the present invention is used for the transport of a single biological material sample or a single container of samples of biological material, whether the latter is a cassette 101 or a slide 201 (FIG. 4B shows the arrangement for the transport of a cassette 101), in order to allow a stable transport and to mitigate unwanted accelerations or decelerations. The capsule-shaped container 301 consists, in the embodiment illustrated in FIGS. 4A and 4B, of a main body 311, within which said single container of biological material sample can be housed, and of a closure body 321, which allows to enclose the main body 311 or to integrate it to define the desired form of transport and, at the same time, to maintain an adequate protection of the content. The handling or removal of the closure body 321 therefore allows access and possible taking of the biological tissue material transported within the main body. In particular, the handling or removal of the closing body 321 allows to arrange the capsule 301 from a closed configuration, suitable for the transport step, to an open configuration, suitable for step of loading or unloading of the content.

Each capsule 301 can be equipped with an identification element, for example a barcode or other two-dimensional code or a unique RFID tag, which allows its traceability along the handling system according to the present invention. This also allows to associate to each capsule 301 the cassette 101 or slide 201, also equipped with an identification element preferably in form of a two-dimensional code, from the insertion to the extraction of the same, ensuring further traceability of the biological tissue sample during the transport steps.

The handling system can, therefore, be provided with one or more identification devices, able to identify each capsule 301 being handled and/or each case 101 or slide 201 being loaded/unloaded from the related capsule 301, ensuring traceability along the network of pipes of the system itself and the loading/unloading areas, as described in detail below. The identification devices can be further assisted by one or more sensors, for example at each work station and/or work location, thus defining an identification system. The identification devices or the aforementioned identification system can, therefore, perform the appropriate communication regarding the position and content of each capsule 301, consequently informing the Laboratory Information System (LIS) of the anatomical pathology laboratory 1, where provided.

Within each compartment of the anatomical pathology laboratory 1 there is at least one work location, exemplified with a workbench in FIG. 1 and with a box connected to one of the secondary transport apparatuses in FIG. 2. An operator, for manual operations, or an automated or semi-automated instrument, interfaces in correspondence with the aforementioned work location, in order to perform a specific work step or a specific work protocol.

Each work location comprises a loading/unloading area of biological tissue samples from and to the respective portion of the secondary transport apparatus to which the work location itself is connected. The loading area consists of a sending station and eventually a loading station of the capsules 301. The unloading area consists of a receiving station and eventually an unloading station of the capsules 301. The loading and unloading of the cassettes 101 or slides 201 into/from the capsule 301 can be carried out in the same loading/unloading areas in automatic mode, i.e. without the necessary human intervention. In this case, the loading/unloading stations could be separated from the sending/receiving stations of the capsules 301, for example, by means of a robotic arm able to automatically handle any cassettes 101 or slides 201 by extracting or inserting them, according to the needs, from the capsule 301. In this configuration, a buffer station can be provided in case of multiple sending or close sequential sending of the biological tissue samples.

Figure 5A:
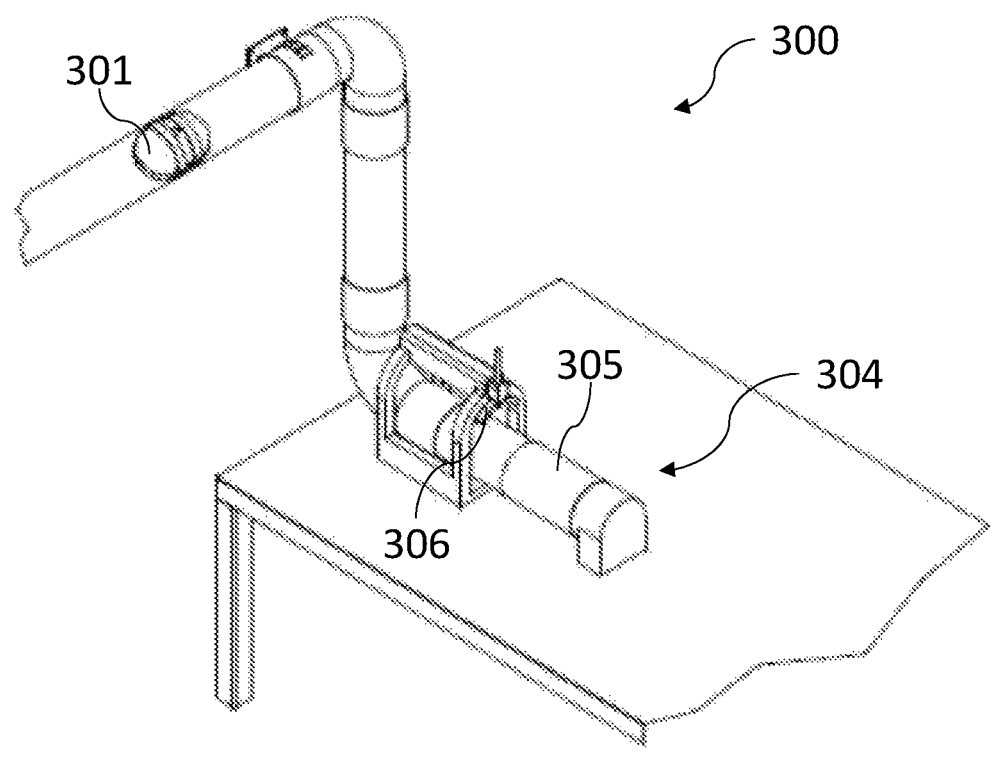
FIG. 5A is a perspective view of the sending/receiving station of the capsules in transport condition.
Figure 5B:
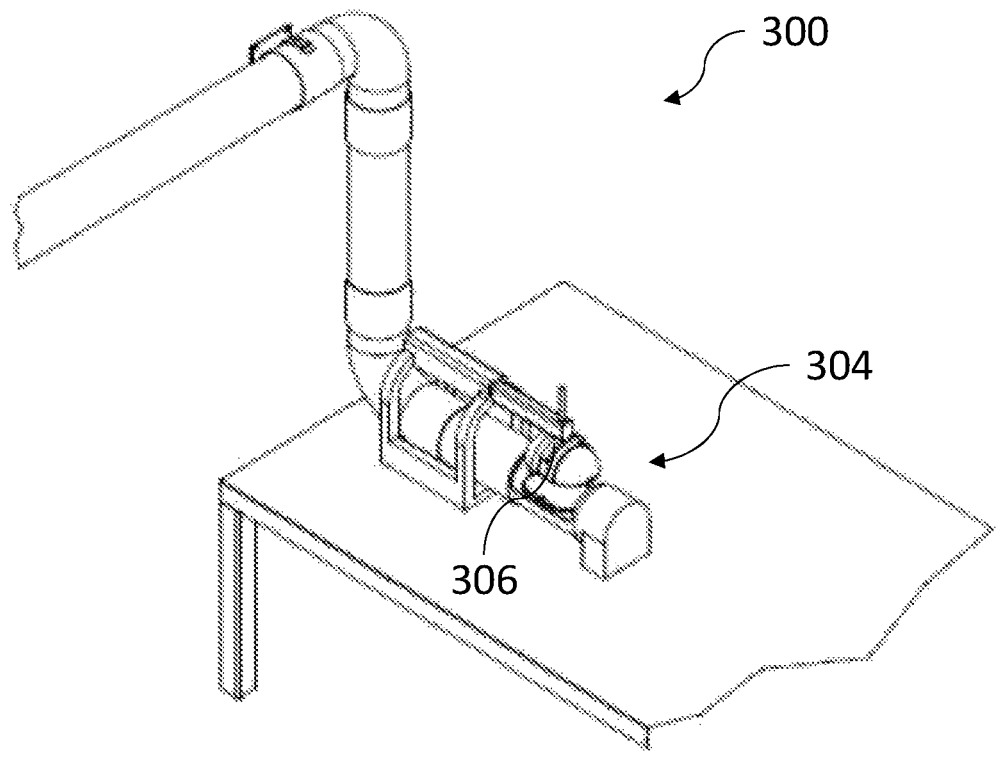
FIG. 5B is a perspective view of the sending/receiving station of the capsules in working condition.

FIG. 1, and in greater detail FIGS. 5A and 5B, show the configuration in which, within the loading/unloading area of each work location, a single station 300 for sending/receiving the capsules 301 is present. The latter therefore acts simultaneously as a receiving station and as a sending station of the capsules 301 in the direction of the main transport apparatus 110 which, in turn, will route the capsule

301 itself towards a compartment, and consequently to the related secondary transport apparatus, which can be placed upstream or downstream in the operative flow of the laboratory. Eventually, the capsule 301 can be routed by the main transport apparatus 110 to the input station 11 or to the output station 21. Furthermore, the aforementioned sending/receiving station 300 also acts, in the present embodiment, as a loading/unloading station of the capsules 301 departing/arriving from/towards the related work location. Such station 300 is therefore also an help to the loading and unloading operations of the biological tissue samples.

With regard to each individual work location, a display device may further be present, for example a tablet or any other video data display system, part of the handling system and operatively connected with the reference secondary control unit in the reference work station. By using the aforementioned tablet, the operator placed at the aforementioned work location can check the conformity of the biological tissue samples to be treated consistently with the provisions of the work protocol assigned to them, i.e. the succession of steps of an anatomical pathology process to be carried out on the biological tissue sample itself, and which may differ from sample to sample. In particular, in case of loading/unloading areas, the operator can proceed with the manual identification of the biological tissue sample, by manually scanning the identification element with which it is provided (i.e. barcode or RFID tag of each cassette or slide), and for the purpose of checking/confirming the loading/unloading of the biological tissue sample from the capsule. This identification/scanning can still take place in an automated manner, for example with the help of a pick-and-place system.

Figure 6:
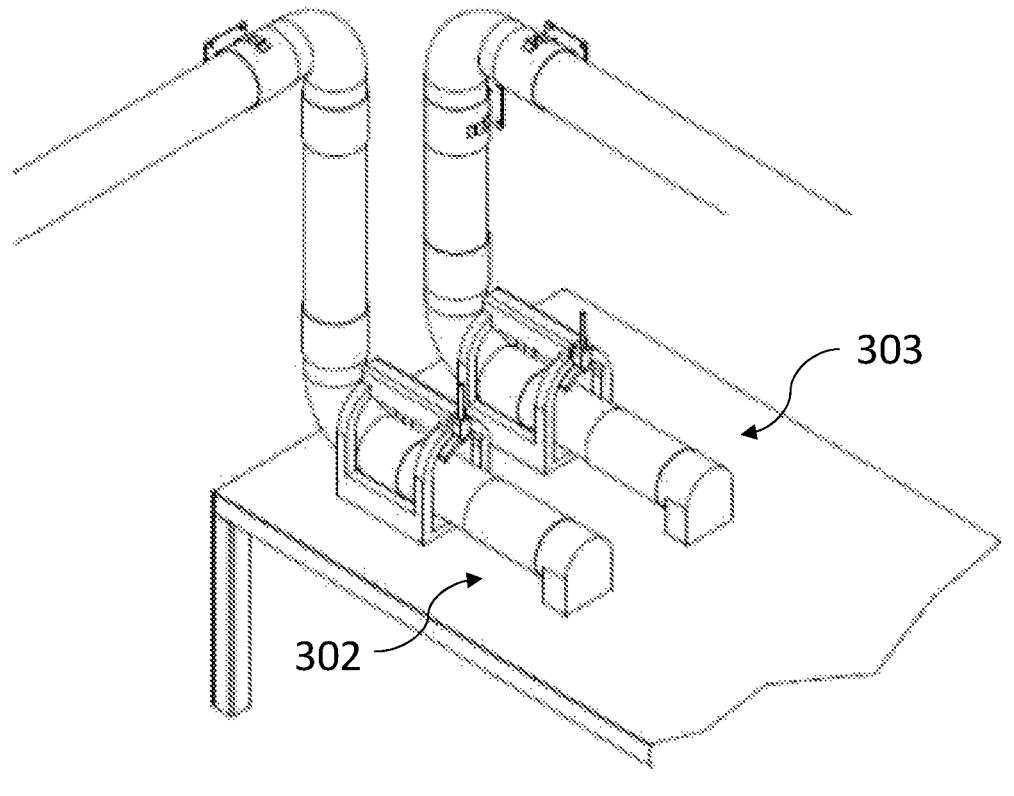
FIG. 6 is a perspective view of a further embodiment of the sending/receiving station.

A further embodiment of the handling system according to the present invention can also provide a pair of sending/receiving stations separated into one or more work locations, for example a receiving station 302 and a sending station 303 as illustrated in FIG. 6. This allows to define different handling paths for the capsules 301 entering or leaving the work location itself, minimizing the complexities related to the throughput and management of the capsules in case of a different number between sending and receiving operations. Furthermore, the separated loading/unloading stations can be provided in the work stations in which the biological tissue sample is intended to change the container that houses it, for example the receiving capsule contains a cassette 101 but in the location a plurality of slides 201 are produced, which must in any case be routed into the handling system. These additional embodiments can be further combined and be different from compartment to compartment, i.e. from work station to work station, even within the same anatomical pathology laboratory.

Preferably, the capsule 301 is not completely removable from the pipe in which it is moved. The inability to completely remove the capsule 301 is limited to normal operating conditions where its replacement and maintenance do not fall within the aforementioned normal operating conditions. The capsule 301 is therefore an important component of the handling system since, if unable to detach from the same, it defines a locking function able to perform part of the safety tasks in the traceability of the samples handled within it.

The realization of the locking function is therefore allowed not only by the capsules 301 but also by the aforementioned loading/unloading areas. Each of the sending/receiving stations 300 provided for the work locations comprises, in the preferred embodiment described therein, an end stroke device 304 able to allow the stopping and possibly locking of the capsule 301 at the desired location and able to arrange the aforementioned capsule 301 in working conditions, allowing the latter to be loaded/unloaded through the insertion/extraction of biological tissue samples, or in transport conditions, allowing the capsule 301 to be moved within the pipe to which the loading/unloading station 300 belongs. In particular, an end portion of the pipe relating to each location can be used as an end stroke device. In correspondence with the end stroke device 304, an opening or an openable end portion of the sending/receiving station 300 can be provided, able to arrange the station 300 itself in working condition or in transport condition. For example, as shown in FIGS. 5A and 5B, in correspondence with the end stroke device 304 an end portion 305 of the pipe relating to the loading/unloading station 300 opens when the capsule 301 arrives. Therefore, the aforementioned end portion 305 allows to arrange the sending/extraction station 300 in working condition to load/unload the capsule 301. Similarly, the aforementioned terminal portion 305 allows to arrange the sending/extraction station 300 in transport condition in order to handle the capsule 301 within the pipe to which the loading/unloading station 300 belongs.

In order to obtain automation even in the opening, and possibly closing, operations of the capsule 301, the loading/unloading station 300 is further provided with a gripping device 306 able to grip and space the closure body 321 from the main body 311. In a preferred embodiment, such gripping device 306 comprises a magnet, advantageously shaped to adapt to the surface of the capsule 301 and, in particular, to suitable magnetic elements able to cover at least partially the external surface of the capsule 301 itself in the portion of the closure body 321.

The biological tissue samples to be analyzed and handled within the main 110 and secondary 130, 150, 160, 170 transport apparatuses are initially defined within one or more sampling points, which are not normally an integral part of the anatomical pathology laboratory. An example of a sampling point is the operating room, where the surgeon removes the biological tissue sample by biopsy and isolates it within an appropriate container.

In order to obtain a better integration of the handling system according to the present invention, the main transport apparatus 110 can be operatively connected to one or more sampling points of the biological tissue samples, i.e. to the points where, for example, biopsies are performed. In this case, an input station is arranged at the sampling point and further comprises an initialization apparatus of the taken biological tissue sample. In particular, a plurality of input locations, and therefore of initialization apparatuses, can be arranged in correspondence with as many plurality of sampling points even if they are part of a same input station. The initialization apparatus is able to generate a unique code of the biological tissue sample (or group of samples) taken from the same patient in the same occasion. Such unique code can be further defined as a "case report". The unique code, or case report, associated to the tissue sample inserted in the main transport apparatus 110 is therefore managed by the control means of the handling system (described in greater detail below), said control means being in form of electronic controllers operatively connected to the initialization apparatus.

In the present embodiment, the input station 11 also defines the check-in station of the samples arriving at the anatomical pathology laboratory 1, wherein the "check-in step" of the aforementioned biological tissue samples is carried out. In this case, the steps related to the check-in station, for example the registration of the tissue sample within the anatomical pathology laboratory 1, will not be further described. Similarly, any intermediate step necessary for the definition of a suitable tissue sample, typically carried out downstream of check-in and upstream of processing, for example the operations related to the sectioning step, will not be further described.

Alternatively, the input station can be defined as a mere routing station of the biological tissue sample towards the anatomical pathology laboratory, the latter requiring, therefore, a dedicated check-in station and/or sectioning station (not illustrated and not described further).

Furthermore, in the present embodiment, the output station 21 defines the connection with one or more storage locations of biological tissue samples, for example refrigerated or parameter-controlled warehouses of the automatic, semi-automatic or manual type. Each storage point is provided with an identification apparatus able to identify the unique code associated with the biological tissue sample possibly recovered from the storage location and inserted, through the output station 21, within the main transport apparatus 110 and, therefore, within the handling system according to the present invention. The unique code detected for the biological tissue sample recovered from the storage locations is therefore managed by the control means of the handling system (described in greater detail below), said control means being in form of electronic controllers operatively connected to said identification apparatus of each storage location.

To improve the management of the flow of biological tissue samples towards the storage locations, the handling system according to the present invention can be provided with one or more buffer locations able to group the biological tissue samples to be sent to the storage locations. In particular, a plurality of buffer stations can be provided, one for each type of biological tissue sample container, for example the handling system can be provided with a buffer station for slides 201, a buffer station for cassettes 101 and a buffer station for containers of tissue samples to be sectioned or still to be fixed (not shown). This allows to rationalize the use of available resources according to each biological tissue sample container.

Furthermore, the storage locations can be part of the anatomical pathology laboratory, that is of the handling system, for example contained in a special compartment dedicated to the storage, or be arranged in positions more or less distant from the laboratory itself.

In the preferred embodiment described above, it therefore appears evident that the secondary transport apparatuses 130, 150, 160, 170 can operate parallel to each other without the workload of each of them interfering with the workload of the others. On the contrary, the main transport apparatus 110 appears strictly connected to the workload to which each work station 30, 50, 60, 70 and, consequently, each secondary transport apparatus 130, 150, 160, 170 is subjected. For this reason, the handling system further comprises control means of these transport apparatuses able to manage the routing and handling of the biological tissue samples in the work stations 30, 50, 60, 70 according to the work protocol associated to the biological tissue samples, defining a path through the aforementioned work stations 30, 50, 60, 70 for each of the aforementioned biological tissue samples. Furthermore, the control means are able to manage the routing and handling of biological tissue samples in the work locations 31, 32, 33, 34, 51, 52, 53, 54, 61, 62, 71, 72, 73, 74 according to the workload of the work locations 31, 32, 33, 34, 51, 52, 53, 54, 61, 62, 71, 72, 73, 74 themselves and to the work protocol associated to the biological tissue samples, identifying one of the work locations 31, 32, 33, 34, 51, 52, 53, 54, 61, 62, 71, 72, 73, 74 for each biological tissue sample. Therefore, the control means manage the handling of biological tissue samples within the main transport apparatus 110 and the routing and handling in the secondary transport apparatuses 130, 150, 160, 170. In particular, the control means move forward the biological tissue sample in the path between the work stations 30, 50, 60, 70 when the downstream station in the aforementioned path is free to process the biological tissue sample. Furthermore, the control means move forward the biological tissue sample to the identified work location when the identified work location is free to process the biological tissue sample.

Thus, the aforementioned management logic of the biological tissue sample allows to apply a PULL-type logic to the handling, which allows a convenient management of the samples even through possible manual operations performed by the operator.

Such control means are realized, in the preferred embodiment, by means of a distributed architecture system provided with electronic controllers. These comprise a central control unit 100 operatively connected to the main transport apparatus 110, i.e. a single computer, or a computer network, provided with a software able to manage the routing and handling of biological tissue samples from or to the main transport apparatus 110. The central control unit 100 is in charge of governing the flow of operations and the handling steps within the perimeter of the main transport apparatus 110. In particular, the central control unit 100 is able to manage the routing and handling within, that is from and towards, said work stations 30, 50, 60, 70 according to the work protocol associated with the biological tissue samples to be handled. This can further result in the control of the diverter devices 135, 155, 165, 175 provided for each secondary transport apparatus 130, 150, 160, 170 in correspondence with the main transport apparatus 110.

Furthermore, the distributed architecture system comprises, as further electronic controllers, a plurality of secondary control units 111, 103, 105, 106, 107, 121 arranged respectively at the input station 11, at each secondary transport apparatus 130, 150, 160, 170 and at the output station 21. Therefore, the secondary control units 111, 103, 105, 106, 107, 121 are in charge of governing the flow of operations and the handling steps within the perimeter of the related secondary transport apparatuses 130, 150, 160, 170. In particular, the secondary control units 111, 103, 105, 106, 107, 121 are able to manage the routing and handling within, that is from and towards, said work locations 31, 32, 33, 34, 51, 52, 53, 54, 61, 62, 71, 72, 73, 74 according to the workload in the aforementioned work locations 31, 32, 33, 34, 51, 52, 53, 54, 61, 62, 71, 72, 73, 74 and to the work protocol associated with the biological tissue samples to be handled.

The management of the routing of the capsules 301 within the pipe network of the main 110 and secondary 130, 150, 160, 170 transport apparatuses, as well as the traceability of the biological tissue samples, is also assisted by the communication between the software of the central control unit 100 and/or of the secondary control units 111, 103, 105, 106, 107, 121 and the hardware components. These last can be arranged along the pipes of the handling system, for example the identification devices of the capsules 301, at each work station and/or work location, for example the identification devices of the cassettes 101 and/or of the slides 201, or it can simply result from the plurality of sensors, antennas, buffers and diverter devices that allow the routing and management of biological tissue samples. In particular, the sensors arranged at each work station and/or at each work location are able to identify the biological tissue samples arriving, departing or in transit from the work stations and/or the work locations, assisting the management work carried out by the main 100 and secondary 111, 103, 105, 106, 107, 121 control units, for example by means of flow verification tasks.

In a distributed control system of the aforementioned type, the task of supervising the various handling steps of the biological tissue samples within the main transport apparatus 110 is delegated to the central control unit 100 while the secondary control units are entrusted with the tasks of managing the transport of the biological tissue sample within the secondary transport apparatuses 130, 150, 160, 170 respectively in each work station 30, 50, 60, 70. In any case, the secondary control units can be of the same type as the central control unit, although they are intended for different tasks. The use of control sensors distributed along the entire handling system is an important aid for the evaluation of the workload by the secondary control units. The sensors that can be used within the handling system include, for example, presence sensors, sensors for RFID reading/writing, sensors for reading 2D codes (barcodes, QR codes, etc.), force sensors (load cells, strain gauges, proximity sensors or manual switches).

The use of a distributed control system has the advantage of allowing the completion of the work steps within the work stations even when the main transport apparatus 110 and/or the central control unit 100 are out of service. A further advantage lies in the possibility of allowing the completion of the work steps within the active work stations, even when one of the work stations and/or the related secondary control unit is out of service. All this results in a further advantage related to the possibility of implementing maintenance or troubleshooting operations in one of the work stations or in one of the designated transport apparatuses without completely isolating the entire handling system or the anatomical pathology laboratory 1.

Figure 8:
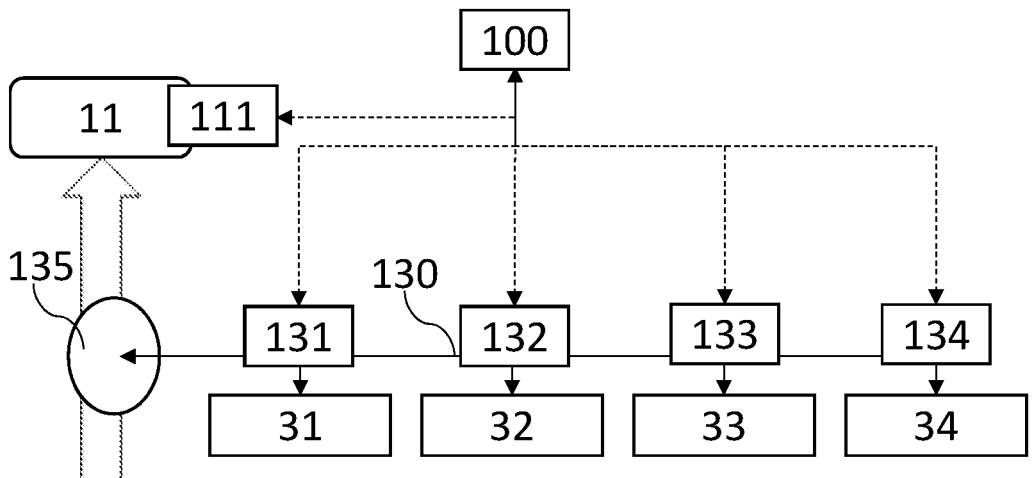
FIG. 8 is a schematic block view of a further embodiment of the anatomical pathology laboratory and the related handling system of FIG. 1, wherein the control system is of the distributed architecture type at the work locations.

An alternative embodiment of the distributed control system is illustrated in FIG. 8, by way of example only for the processing station 30. In this case, in addition to the central control unit 100, the secondary control unit 111 arranged at the input station 11, and the aforementioned sensors, further electronic controllers are provided such as a plurality of secondary control units 131, 132, 133, 134 respectively arranged at each work location 31, 32, 33, 34 of the aforementioned processing station 30.

The use of a distributed control system at each work location has the advantage of allowing maintenance or troubleshooting operations in one of the work locations without completely isolating the entire handling system or the anatomical pathology laboratory 1.

Figure 9:
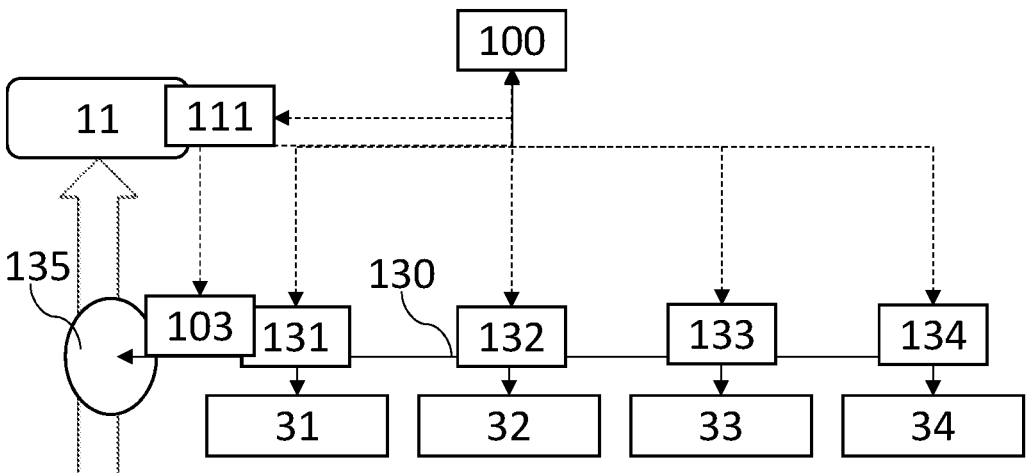
FIG. 9 is a schematic block view of a further embodiment of the anatomical pathology laboratory and the related handling system of FIG. 1, wherein the control system is of the distributed architecture type at the work stations and at the work locations.

Finally, a further embodiment of the distributed control system is illustrated by way of example in FIG. 9, also in this case representing only the processing station 30 but whose concept can be consequently extended to the entire handling system, i.e. to the entire anatomical pathology laboratory 1, according to the present invention. The embodiment illustrated in FIG. 9 derives from the combination of the architectures illustrated, and previously described, in FIGS. 2 and 8. In this case, therefore, the distributed control system provides for a central control unit 100, a secondary control unit 111 arranged at the input station 11 and a plurality of secondary control units 103, 131, 132, 133, 134 respectively provided at the secondary transport apparatus 130 and at each work location 31, 32, 33, 34 of the processing station 30.

An alternative to the distributed control system is defined by a control system of the centralized type (not shown). This includes a central control unit, i.e. a single computer equipped with a software able to manage the routing and handling of biological tissue samples as described above. Furthermore, the centralized control system comprises a plurality of sensors arranged at each secondary transport apparatus of each work station and/or at each work location in which the sensors are able to identify the biological tissue samples arriving, departing or in transit from the work stations and/or the work locations. In a centralized control system of the above type, the task of governing the entire flow of operations, as well as the step-by-step management of the various handling steps within the entire handling system, is the exclusive domain of the aforementioned central control unit while the sensors are only entrusted with flow verification tasks required by the aforementioned central control unit. Therefore, the handling of biological tissue samples within the main transport apparatus, relatively to the work protocol assigned to them, is exclusively delegated to the central unit which provides for the handling through the work stations. The handling of biological tissue samples, within the secondary transport apparatus, to the work locations of a work station is instead assisted by the sensors which are an aid to the determination of the workload, even if the management is always exclusively entrusted to the central control unit.

It is evident that combinations of the aforementioned embodiments, as well as architectural variations which lead to a centralized or distributed control structure, fall within the inventive concept of the present invention although not illustrated or described in detail.

The centralized or distributed control architectures, as described above, can equally be applied both in the case in which the handling system consists entirely of a transport system of the pneumatic type and in the case in which the handling system has one transport apparatus, for example the main transport apparatus, of the pneumatic type and one or more apparatuses of the belt type, for example one or more of the secondary transport apparatuses, as described in greater detail below.

The start of an anatomical pathology process requires the necessary presence of a biological tissue sample taken from a human being, i.e. the patient. For this reason, the sampling point is equipped to perform the aforementioned sampling operations, or biopsy, and the insertion of the samples in specific containers (not shown). Such containers, each comprising one or more biological tissue samples from the same patient, start the routing towards the anatomical pathology laboratory 1 from the input station 11 which, in the present embodiment, also constitutes the check-in station of the laboratory 1 itself.

The biological tissue sample can be taken according to different techniques. This implies that almost whole portions of an organ can arrive at the input station 11 of the anatomical pathology laboratory 1, therefore a very huge biological tissue sample, or very small portions, for example biological tissue samples taken using the so-called "needle aspiration" technique.

The huge tissue samples are subjected to the "reduction step", that is the cutting of the huge biological tissue sample into small parts and such as to allow its insertion into the cassettes 101. In each of the aforementioned cassettes 101, one or more parts of the same biological tissue sample from the same patient can therefore be inserted. The "reduction step" may not be necessary in the case of biological tissue samples obtained from reduced biopsies or by needle aspiration. These biological tissue samples are then directly inserted into the cassette 101.

For the sake of simplicity, it is assumed that the biological tissue samples arrive at the input station 11 within containers suitable for following treatment at the next work stations, i.e. already within the cassette 101. Furthermore, it is assumed that such incoming containers at the input station 11 are further provided with an identification element, for example a two-dimensional code printed on the container itself, readable by an identification device arranged at the input station 11 and, possibly, in one or more subsequent points of the handling system. It should be noted that, according to a typical practice of the preparation of biological tissue samples for anatomical pathology analysis, these are drowned in formalin as soon as they are taken from the patient. Formalin is an organic solvent that guarantees the perfect preservation of the biological tissue sample and, at the same time, the formation of an aseptic environment that prevents the biological tissue sample from being altered during the following working steps to which it is subjected.

The capsule identification device has the function of correctly identifying the capsule along the main 110 or secondary 130, 150, 160, 170 transport apparatuses and possibly at the loading/unloading areas, i.e. at the loading/unloading stations 300.

The identification device of the cassettes has the function of correctly identifying the cassette at the loading/unloading areas, i.e. at the loading/unloading stations 300, and possibly at each work location (where these cassettes are processed).

The slide identification device has the function of correctly identifying the slide at the loading/unloading areas, i.e. at the loading/unloading stations 300, and possibly at each work location (where these slides are processed).

Finally, further presence devices can be provided to support, for example, the sending/receiving stations, the capsule loading/unloading stations, the pick-and-place systems and the diverter devices (also in case of embodiments which involve the use of different types of transport, such as for example the belt type transport, as described in greater detail below). These presence devices have the task of checking the presence or not of cassettes or slides within the capsules, or within carriers of a different nature and intended anyway for handling the aforementioned containers of biological tissue samples.

The input station 11, where the check-in step is carried out, allows to initialize the container being processed by means of the initialization apparatus arranged within the same input station 11. In the present embodiment, such initialization apparatus (not shown) is made by the identification device of the cassettes 101, for example a QR code reader, operatively connected to the secondary control unit 111 of the input station 11, for reading of the two-dimensional code with which the aforementioned container is provided. The initialization apparatus, by means of the secondary control unit 111 or directly of the central control unit 100, performs a control of the unique code previously generated at the moment in which the sampling on the patient was performed, i.e. of the code related to the case report and therefore to the patient and to the biological tissue sample taken, or to the group of biological tissue samples taken in the same circumstance. The samples associated with the same unique code are then inserted in the main transport apparatus 110, since this unique code is managed by the control means 100 of the handling system, said control means 100 being operatively connected to said initialization apparatus. This unique code can later be associated with one or more derived codes related to the biological tissue sample treated in the next working steps, for example a plurality of derived codes for each of the slides 201 made in the subsequent microtomy step. In this way, from the first step of entry within the handling system, even if outside the anatomical pathology laboratory 1, the conditions are created to ensure traceability on each biological tissue sample and the appropriate association with patients to which they belong and, in particular, the possibility of grouping by case report in the subsequent work steps. In particular, this traceability is even stronger in the case in which the input station is arranged at the sampling point of the biological tissue sample.

The entry of biological tissue samples at the input station 11 allows to determine and, consequently, associate with each sample a work protocol. The latter is initially determined by the type of clinical analysis to be carried out according to the process standards of the anatomical pathology laboratory 1 or according to the request of the pathologist in charge of the case. For example, a plurality of standard work protocols can be loaded in the central control unit 100, for example the work stations to be used, the sequencing in the stations, the number of slides to be obtained. This allows the biological tissue sample to be routed correctly in the event that no changes to the protocol are needed or required.

The term work protocol means, in the present invention, the set of anatomical pathology steps or procedures to be carried out on the reference biological tissue sample. This work protocol is assigned on the basis of the type of biological tissue sample to be processed and the type of investigation to be carried out on the biological tissue sample itself. Furthermore, this protocol is usually assigned or modified by the pathologist for each biological tissue sample downstream of the reduction step (not shown) or downstream of the check-in step, corresponding in the preferred embodiment to the entry of the biological tissue sample within the input station 11. Additionally, the pathologist can make further changes, for example requests for additional slides or special stains, downstream of the microscopy step.

The work protocol can provide, for example, the number of slides 201 to be made from each cassette and/or the indication of the so-called level (i.e. the depth of the paraffin block) at which to cut a first slice of tissue. Furthermore, the work protocol can include how many samples in the form of a cassette 101 or in the form of a slide 201 must be derived from the reference samples entering the input station 111 if, for example, the samples access the input station 111 within containers different from a cassette 101 or a slide 201. Furthermore, the work protocol can be predefined, for example, by a plurality of standard protocols which can be loaded in the central control unit 100 and/or can be modified by the pathologist during one of the work steps, for example downstream of the microscopic evaluation step to integrate further investigations.

An example of a work protocol is shown below for sentinel lymph node tissue sample:

make two normal slides with two or more sections for EE;
make three normal slides with two or more sections for PAS;
make three special slides with two or more sections for TRICHROME;
make six normal slides with a single section for IF;
make five normal blank slides.

From the work protocol illustrated above, in addition to the number of slides 201 to be made for a cassette 101 containing the sentinel lymph node tissue sample, the different steps for which each slide is later assigned can be identified, including the possibility of direct storage of normal blank slides, i.e. slides that will not undergo the staining step and will be intended for storage. Therefore, two slides will be routed to the so-called hematoxylin-eosin (EE) staining, three slides will be routed to Schiff staining (PAS), three slides will be routed to Masson staining (TRICHROME) and six slides will be directed to Immunofluorescence (IF) staining. The five blank slides can, for example, be later used in the event of a request for modification of the work protocol by the pathologist after the microscopic analysis step.

The routing of the plurality of slides 201 made according to the aforementioned protocol must, therefore, be carried out according to the type of subsequent staining to be performed. In the example of the protocol, two slides (EE) must be handled in the work location equipped with a traditional staining instrument, while the remaining twelve (PAS, TRICHROME, IF) must be handled in the work location equipped with a special staining instrument. In particular, given the different nature of special stains, each group of slides intended for special staining may have to be routed at different work locations depending on the workload of each of them.

The station for loading/unloading the capsules 301 used for sorting, corresponding in the preferred embodiment with the sending/receiving station 300 of the capsules 301 themselves, is arranged at the input station 11.

The cassettes 101 are therefore suitably identified, by means of the cassette identification device (not shown), and correlated with the unique code generated by the initialization apparatus, i.e. by the central control unit 100 or by the secondary control unit 111. The loading/unloading station automatically inserts, for example through the use of a pick-and-place system, each cassette 101 within the related capsule 301 which is then in turn sent to the next destination via the pneumatic mail pipes network. Alternatively, the cassette 101 can be manually loaded into the related capsule 301 by the operator arranged in correspondence with it, limiting the station 300 to only sending/receiving the capsules 301. The capsule 301 is preferably provided with a unique RFID tag able to allow the detection of the capsule 301 itself within the pipes of the handling system of the present invention. Furthermore, the central control unit 100 and/or the secondary control unit 111 provided at the input station 11 allow to associate the unique code generated for the transported sample and/or the related cassette 101 with the unique RFID tag of the capsule 301, thus ensuring the complete traceability of the tissue sample even during the transport step.

The handling system according to the present invention is able to conveniently handle and route the capsule 301 towards the next work station identified by the work protocol associated with the loaded cassette 101.

In the following description, it is assumed for simplicity that the biological tissue sample must necessarily be manipulated, or processed, within one of the locations of each station. In particular, it is assumed that the tissue sample must be handled in each station according to the sequence illustrated in FIG. 2 following the flow of the work stations from the input station 11 to the output station 21, i.e. it is assumed that the biological tissue sample requires the passage in sequence respectively from the processing station 30 to the microscopic analysis station 70. In any case, the handling system according to the present invention allows to operate on the biological tissue sample with the desired or necessary sequence, even if two or more work stations, which are contiguous in terms of operations or steps to be performed, are physically arranged in non-adjacent locations. Therefore, with the handling system according to the present invention it is possible to determine any sequence of operations on the biological tissue sample, at the same time maximizing the work load assigned to each work station and/or to each work location.

Assuming that the loaded cassette 101 must be subjected to processing, the central control unit 100 will route, by means of the main transport apparatus 110, the capsule 301 towards the processing station 30. The capsule 301 routed to the processing station 30 is then handled again by the secondary transport apparatus 130 provided in the aforementioned station.

According to the structure provided for the first embodiment illustrated in FIGS. 1 and 2, the secondary control unit 103 will determine the work location 31, 32, 33, 34 and, consequently, the processing instrument to which the cassette 101 contained within the capsule 301 must be routed and handled according to the workload of the work locations 31, 32, 33, 34 themselves and the work protocol associated with the biological tissue sample contained within the cassette 101. In particular, assuming two pairs of different processing instruments, the task of the control unit 103 is to route the capsule 301 to the correct pair, according to the assigned work protocol, and to the most suitable work location of the aforementioned pair, according to the workload of each of the two work locations.

The presence of diverter devices, for example of the diverter device 135 provided for the processing station 30, allows to perform the routing as described above and below. Therefore, whenever the routing between two successive stations or between the main transport apparatus and a secondary transport apparatus, and vice versa, will be described, the use of the diverter device (or diverter devices) interposed between them will be implied. Similarly, as previously described, the operation of the aforementioned diverter devices, as well as the transport apparatuses themselves, is delegated to the control units (main or secondary) which, even if not expressly mentioned, will be implied in the addressing and routing of the biological tissue samples and in the management of all electrical, electronic and pneumatic systems involved.

The capsule 301 therefore arrives at the assigned work location of the processing station 30, in which the sending/receiving station 300 is, in the preferred embodiment, further used for the automatic opening of the capsule 301. As for all the locations of the preferred embodiment, the arrival location is provided with a device for identifying the capsule 301 and is also provided with an identification device for the cassette 101, both preferably arranged at the related sending/receiving station 300 of the capsules 301. The secondary control unit 103 operatively connected with this sending/receiving station 300 and, consequently, with the identification devices of the capsule 301 and of the cassette 101 therefore allow to identify the entering capsule 301, by reading the unique RFID tag of the capsule 301 itself, and to identify the cassette 101 to be extracted within it, by reading the two-dimensional code printed on the cassette. In this way the complete traceability of the biological tissue sample entering the designated work location in the processing station 30 is guaranteed.

Also in this case, the positioning of the cassette 101 with respect to the related processing instrument can be carried out manually or by means of an automated aid, such as a pick-and-place system. In any case, a further identification device for the identification code of the cassette 101, particularly useful in the case of manual positioning, can be arranged at the sending/receiving station 300.

It is assumed that the processing station 30 is provided in each work location 31, 32, 33, 34 with suitable automatic processing instruments able to operate according to a batch logic of biological tissue samples. Therefore, the cassettes are distributed one at a time until an appropriate rack of the processing instrument, in which the biological tissue samples to be processed are allocated, is filled. In the case of continuous processing instruments, the cassettes are, instead, sequentially distributed to the required processing instrument without the need for batch accumulation.

The biological tissue samples within the cassettes 101 entering the processing station 30 and, in particular, entering each location 31, 32, 33, 34 are therefore subjected to the "processing" step. At the end of the operation, the processed cassettes 101 are again identified and automatically inserted each into the related capsule 301 at the sending/receiving station 300 and, therefore, routed again in the secondary transport apparatus 130 which, in turn, will route them again in the main transport apparatus 110, according to the logic described above for the arrival at the processing station 30. Later, the operating steps related to the manipulation of the capsule 301 arriving at the next work stations will not be described in detail, where the sending/receiving and loading/unloading features are similar to what previously described for the processing station 30.

The tissue samples contained within the processed cassettes 101 must then be embedded in paraffin. In order to simplify this discussion, this "inclusion" phase (not illustrated) will not be described in detail. The handling of the aforementioned cassettes 101 is similar to what has already been described for the previous processing step, in particular the input and output of the aforementioned step is homogeneous with respect to the previous step, since the biological tissue samples are also handled in the inclusion step within the same cassettes 101. Also in this case, the management of the tissue samples at the inclusion instrument can take place according to a batch logic, with accumulation in suitable racks, or with a sequential logic. Regardless of the routing logic used, the main control unit 100 and the secondary control units 130 can route to the same location the cassettes 101 which are associated with the same case report, i.e. the same unique code.

Paraffin-embedded cassettes 101 must be cooled to allow the paraffin to solidify before being routed to the next work station. In this case, the handling system according to the present invention can be further provided with suitable cooling apparatuses consisting, for example, in suitable cooling tunnels interposed between the inclusion instrument and the secondary transport apparatus or, preferably, defined in a portion of the secondary transport apparatus itself. In the preferred embodiment, in which the handling takes place by means of pneumatic pipes, the cooling apparatus is separated from the secondary transport apparatus and provided with the identification devices of the cassette 101 at the input and output of the cooling apparatus itself. Furthermore, a pick-and-place device can be used both to handle cassettes 101 from the embedding instrument to the cooling apparatus, and to handle them between the cooling apparatus and the sending/receiving station of the capsules 301. Such cooling apparatus can be of the static type, for example realized by means of one or more fixed cooling plates arranged in correspondence with the embedding instrument, or of the movable type, i.e. realized by means of one or more cooling plates able to move the cassette 101 in the direction of the sending/receiving station 300 of the capsules 301.

The cassettes 101 suitably processed and embedded in paraffin are, therefore, sent to the microtomy station 50, handled according to the logic described above within the secondary transport station 150 by means of the secondary control unit 105 at provided work locations 51, 52, 53, 54.

In the "sectioning step", the cassettes can be distributed with a sorting by case report corresponding to the unique code associated with the sample entering the input station 11, as described above. In this case, two alternative embodiments can be configured. A preferred embodiment provides for the handling system to send the embedded cassettes 101 belonging to the same case report sequentially, i.e. one cassette 101 at a time, to the same work location. This allows the same laboratory operator to work on the same case report. In particular, to ensure the traceability of biological tissue samples, these can be managed by the handling system, i.e. by the central 100 and secondary 105 control units, in order to guarantee the sequentiality of arrival only when the microtomy step related to the previously sent cassette 101 to be sectioned has been fully completed. This management can be controlled, for example, by the routing of the sectioned cassette 101 within the secondary transport apparatus 150. In the event that the sorting by case report is not carried out, the sequentiality of the embedded cassettes 101 arriving at the specific work location could be independent from the association with a same patient.

A further embodiment, on the other hand, provides for a buffer device which allows to collect all the embedded cassettes related to the same case report, said buffer device being preferably arranged at the work location to which these embedded cassettes are intended.

In both the embodiments described for the management of the microtomy step, the necessary operations configure the sectioning of the cassette 101 included in one or more slides 201, in relation to the work protocol associated with the tissue sample. In the case of the work protocol described above for the sentinel lymph node tissue sample, a total of 19 slides 201 is produced starting from the same cassette 101 containing the aforementioned sample.

Once its preparation has been completed, each single slide 201 is identified, by means of a suitable device for identification of the slides 201 provided in each work location of the sectioning station 50, and at the same time associated with the case report of the cassette 101 from which it was generated. Furthermore, each slide 201 is associated with one or more successive steps of the work protocol. For example, in the present case for the sentinel lymph node tissue sample, the first two slides 201 of the total of 19 slides 201 produced could be associated with the protocol step related to EE type staining, the next three slides 201 with the protocol step related to PAS staining, the next three slides 201 to the protocol step related to the TRICHROME type staining, the next six slides 201 to the protocol step related to the IF type staining and, finally, the next five slides 201 directly to the protocol step related to the storage.

The association of each single slide 201 to the case report and to the further steps of the work protocol to be carried out is managed by the secondary control unit 105 possibly assisted by the central control unit 100, which maintains the database of the associations of the unique codes generated within the handling system and of the work protocols associated with each cassette 101 and slide 201.

According to what has been described above, a display device can be further present in the work location, by means of which the operator arranged at the aforementioned work location can check the conformity of the biological tissue samples to be treated consistently with the provisions of the work protocol assigned to them. For example, in the "sectioning step" described, the display device could allow the operator to check the type of cut to be made for each slide to be derived from a specific cassette. Similarly, in the previous "processing step" the display device could allow the operator to check the processing parameters for one or more cassettes if these operations are not managed in complete autonomy by the secondary control unit arranged in the processing station.

The slides 201 obtained in this "sectioning step" must be dried to allow the sectioned biological tissue sample to adhere adequately to the corresponding slide 201 before being routed to the next work station. Also in this case, therefore, the handling system according to the present invention can be further provided with suitable heating apparatuses consisting in appropriate heating tunnels interposed between the microtome instrument and the secondary transport apparatus or, preferably, defined in a portion of the secondary transport apparatus itself. In the preferred embodiment, in which the handling takes place via pneumatic pipes, the heating apparatus is separated from the secondary transport apparatus and provided with the identification devices of the slides 201 at the input and output of the heating apparatus itself. Furthermore, a pick-and-place device can be used both to handle the slides 201 from the microtome instrument to the heating apparatus, and to handle them between the heating apparatus and the sending/receiving station of the capsules 301. Such heating apparatus it can be of the static type, for example realized by means of one or more fixed heating plates arranged in correspondence with the microtome instrument, or of the movable type, i.e. realized by means of one or more heating plates able to move the slide 201 in the direction of the sending/receiving station 300 of the capsules 301.

The identified slide 201, associated with the case report and dried, is then inserted within a capsule 301 and, by means of the sending/receiving station 300, sent to the secondary transport apparatus 150 for sending to the main transport apparatus 110 and, later, to the next work station, that is the next working step.

Since the paraffin-embedded biological tissue samples within the cassette 101 are not exhausted, i.e. not completely sectioned, the cassette 101 with the remaining portion of biological tissue sample is stored for any subsequent operation related to a modification or integration of the work protocol. This storage is performed by sending a specific capsule 301 from the secondary transport apparatus 150 to the main transport apparatus 110 and finally to the output station 21.

Further, some of the produced slides 201 may not be sent to the next work station to carry out one of the steps of the work protocol, but they could also be sent to a storage for any subsequent operation related to a modification or integration of the work protocol. In the current example described for the biological tissue samples of the sentinel lymph node, five slides are already provided for in the established work protocol to be "white slides", i.e. slides not to be processed further and to be intended for storage. This storage is also performed by sending a special capsule 301 (or a plurality of these) from the secondary transport apparatus 150 to the main transport apparatus 110 and finally to the output station 21.

In the following "staining step", carried out in the staining station 60, the slides 201 are routed to the work locations 161, 162 of the staining station 60, handled according to the logic described above within the secondary transport station 160 with the aid of the control unit 106. The work locations

161, 162 are defined by two different types of staining instruments arranged within the same compartment but able to carry out respectively a staining of the standard type and of the special type. In fact, the "staining step" can be different for slides 201 even belonging to the same case report, and it is for this reason that a preliminary sorting may be necessary according to the work protocol associated with these in the previous step.

Even in the present staining station 60 the slides 201 can be fed to the respective work location sequentially or in batches. In the preferred embodiment, described therein, the feeding is therefore in batch with a grouping according to the staining protocol to be performed. Therefore, the grouping according to the case report to which they belong is lost, in favor of a better management of the workloads on the single work locations 161, 162. In this case, since these stations are fewer than the previous ones, balancing the workload according to the type of staining to be carried out is very important. To ensure the correct assignment of the loads to each work location 161, 162, the central control unit 100 sorts the slides 201 to be stained at the diverter device 165, while the secondary control unit 105 assigns each slide 201 to the related work location 161, 162 according to the work protocol assigned to the slide 201 itself, i.e. according to the type of staining to be carried out. It can be noted that, in the staining of the slides 201 obtained for the sentinel lymph node biological tissue sample, only three slides are intended for work location 161 for normal staining, while the remaining eleven must be routed to the work location 162 for special staining.

A further embodiment provides, even in this case, a buffer device which allows to collect all the slides to be stained relating to the same step of a work protocol, said buffer device being preferably arranged at the work location for which such slides are intended.

The slides 201 are then fed manually or automatically, for example by means of a pick-and-place system, to the staining device to which they have been routed, or to the related buffer (in this case a double feeding system can be provided for handling the slides to the staining instrument). At the end of the staining step, and usually within the staining instrument, a cover slip is applied to the slide 201 to ensure a better handling in the subsequent microscopic analysis step.

The slides 201 are therefore subjected to automatic staining, following which they are repositioned at the sending/receiving station 300, identified and re-housed individually within the capsule 301 to be routed by the secondary transport apparatus 160 towards the main transport apparatus 110 and, therefore, to the subsequent microscopy station 70.

In a further embodiment (not shown), the different staining instruments (standard and special) can be arranged in different compartments. In this case, the routing of the slides takes place on different secondary transport apparatuses to which the main transport apparatus is interfaced by means of the diverter devices. In the event that the handling of the slides takes place in a batch and not individually, it would also be necessary to sort upstream, i.e. in the compartment of the "sectioning step", the slides that require different staining. For this purpose, one or more buffers could be used to collect the slides intended for a specific staining, and therefore to a specific compartment, in order to subsequently insert them into the capsule intended for handling in the specific staining compartment.

Finally, in the "microscopic analysis step" each stained biological tissue sample, contained within a specific slide 201, is sent to the compartment related to the microscopic analysis, where the pathologist analyzes the biological tissue sample treated in the previous steps. In the embodiment illustrated in FIGS. 1 and 2, a single compartment provided with a plurality of microscopic analysis instruments is represented, but there could also be more compartments suitable for containing one or more of the aforementioned instruments. A more recent alternative consists in the acquisition, using modern techniques that go under the name of "digital pathology", of a scan of the slide, so that the pathologist can directly analyze the scanned image, without physically using the slide for the microscopic interpretation.

Therefore, in the aforementioned "microscopic analysis step" each capsule 301 containing a slide 201 is routed by the main transport apparatus 110, i.e. by the central control unit 100, towards the secondary transport apparatus 170 related to the microscopic analysis station 70. In correspondence with the diverter device 175, the secondary control unit 107 therefore takes charge of the capsule 301 provided with the aforementioned slide 201 and routes it to the correct work location 71, 72, 73, 74 according to the work protocol and the workload of the individual locations. In this case, the work protocol including the unique code of the biological tissue sample, i.e. of the reference case report, can route the slides 201 belonging to the same reference case report towards the same work location. In this way, all the slides 201 belonging to the same case report are sequentially sent to the pathologist for diagnosis. In the event that the doctor needs to receive all the slides at the same time to manage the diagnosis in a different way, a buffer can be provided at the relative work location, so that all the slides routed to the same pathologist, or the same work location, are temporarily stored waiting for completion of the receipt of all the slides belonging to the same case report.

Upon completion of the "microscopic analysis step", as described in the previous work steps, the slides 201 are again identified and then inserted (manually or automatically) into the capsule 301 arranged in correspondence with the sending/receiving station 300 arranged in the compartment of the microscopy station 70. Therefore, the slides are routed again from the secondary control unit 107 to the main transport apparatus 110, by means of the secondary transport apparatus 170. Finally, the main control unit 100 provides, through the aforementioned main transport apparatus 110, for the routing of the capsule 301 at the output station 21. The latter may be responsible for the storage of incoming slides 201 or for their eventual disposal at the end of their life.

Figure 10:
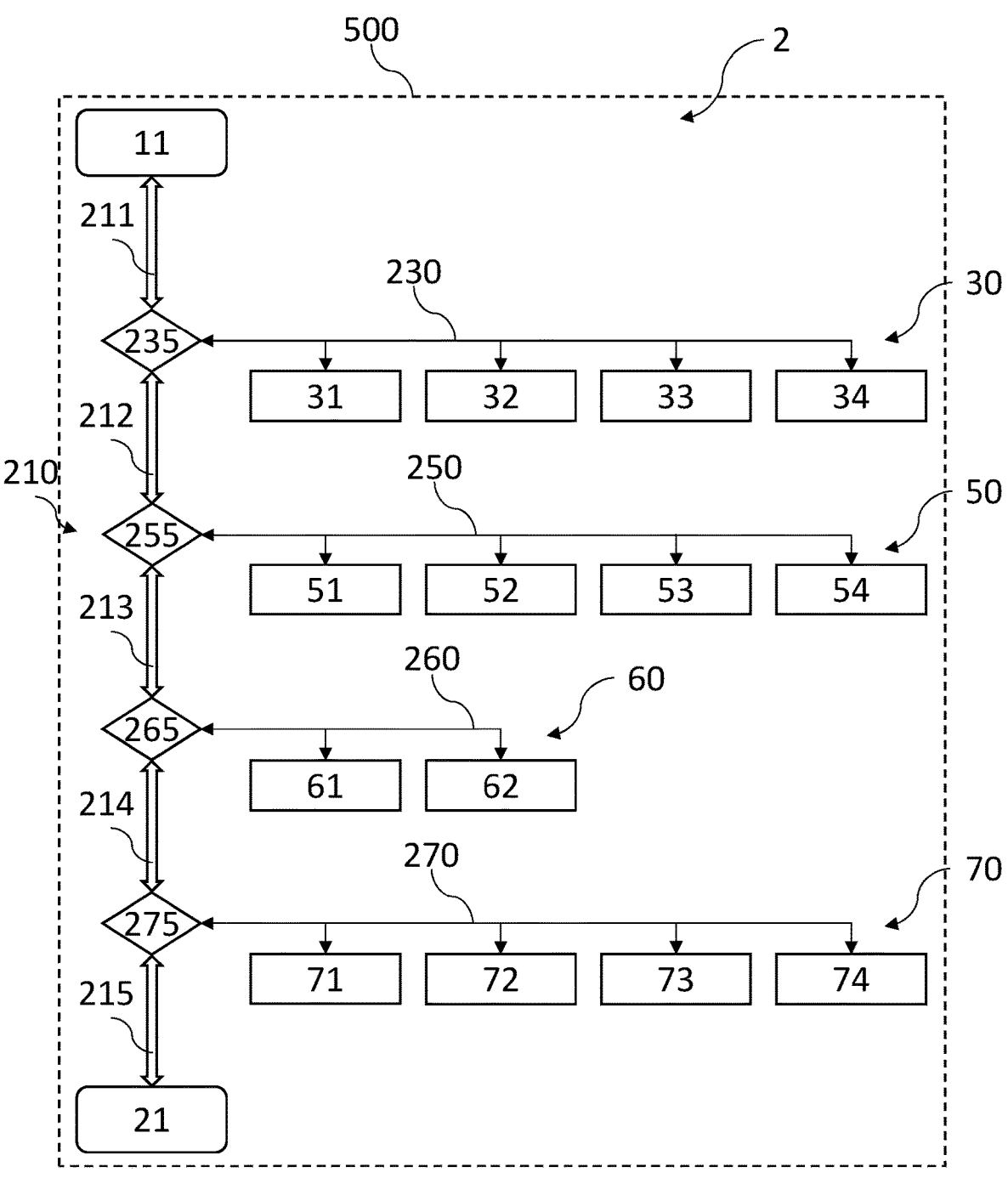
FIG. 10 is a schematic block view of a further embodiment of the anatomical pathology laboratory and the related handling system, according to the present invention.

With reference to FIG. 10, a further embodiment of the handling system according to the present invention is illustrated. According to this further embodiment, the main transport apparatus 210, again of the pneumatic pipe type, comprises a plurality of pipes 211, 212, 213, 214, 215 separated and arranged in succession from the input station 11 to the output station 21, in which each pipe is able to connect two successive work stations 30, 50, 60, 70. The main transport apparatus 210 indeed comprises a plurality of diverter devices 235, 255, 265, 275 arranged between two successive pipes, each of the aforementioned diverters being able to directly connect in a bidirectional way the two ducts between which it is interposed, and indirectly connect the work station arranged between the two pipes arranged in succession. In particular, each diverter device 235, 255, 265, 275 is operatively connected with two different pneumatic mail pipes 211, 212, 213, 214, 215 arranged in succession and, respectively, with the secondary transport apparatuses 230, 250, 260, 270 of each work station 30, 50, 60, 70. In this embodiment, the non-removal of the capsule within the pipe in which it is handled, while efficiently implementing the traceability of the capsule itself and, therefore, of the biological tissue sample contained therein, requires automated instruments (such as pick-and-place) to allow the handling of biological tissue samples from one capsule to another.

A further embodiment, not illustrated, can provide for the use of a hybrid pneumatic structure which provides, even only partially, both the use of single pipe movement (possibly in several sections) and the use of a plurality of pipes between two or more work stations, the input station and/or the output station.

Figure 7:
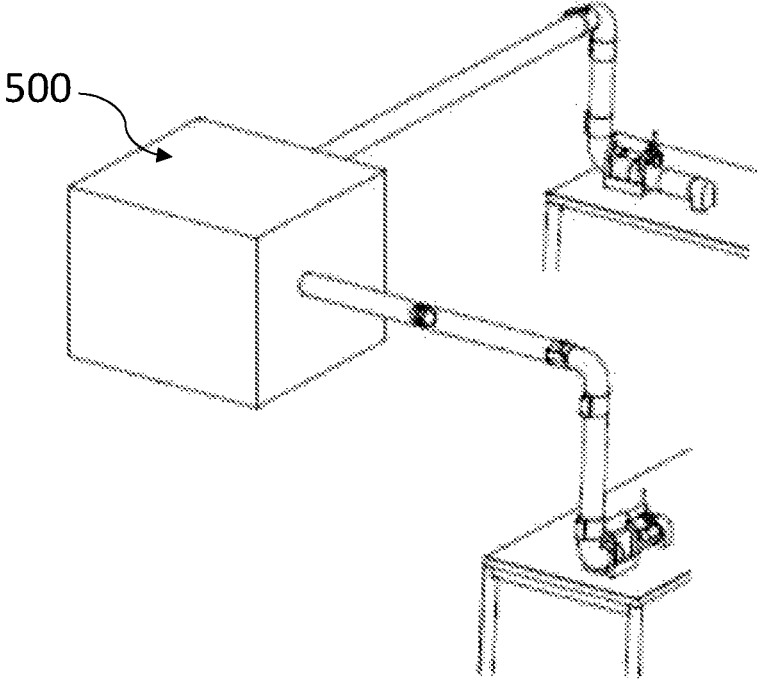
FIG. 7 is a perspective view of a further embodiment of a work station.

In a further embodiment, illustrated by way of example in FIG. 7, the secondary transport apparatuses can be made by means of a single pipe divided into several sections at least equal to the number of locations to be served, in which at each location a diverter device is implemented able to allow the biological tissue sample deviation from the same pipe towards the work location. These diverter devices are managed by the secondary control unit of the reference work station. In the aforementioned FIG. 7, it is illustrated by way of example a schematic diagram of the diverter device 500 to be used for each pipe and corresponding, again, to any known diverter device usable in pneumatic pipe apparatuses. Alternatively, it is possible to use a single diverter device provided with a number of deviations equal to the number of work locations. In both the solutions described, the pipe and the related diverter devices are able to directly connect in a bidirectional way the work locations of one of the work stations to the related secondary transport apparatus, and indirectly connect to the main transport apparatus. This allows to minimize the impact of the transport system at each served station, but at the same time forces the serialization of the transport since, for example, the sample routed to the last location must necessarily pass through the sections in correspondence with the upstream stations. The diverter device is therefore able to connect the main transport system with the secondary transport system of the reference station, allowing the mere deviation within the single pipe of the secondary transport system. Alternatively, the diverter devices could be placed at the deviations of the main transport apparatus towards the secondary transport apparatuses, as described in the embodiment of FIGS. 1 and 2, and also at each work station, as described in the embodiment of FIG. 7. Further details, as well as the description of the operation, of the above embodiments will not be further described since what described for the previous embodiments is applicable mutatis mutandis.

According to a further embodiment (not shown) the secondary transport apparatuses are of the belt type provided with one or more guide lanes, in which the biological tissue samples, for example contained within the cassettes 101 or the slides 201, are handled to the work locations of one of the work stations within one or more guide lanes. Additionally, a carrier, of the single or batch type, can be provided to contain the aforementioned cassettes or slides and to allow for better management within the guide lanes. Such carriers can be further provided with unique RFID tags, or different identification elements, to allow the traceability and deviation of the right carriers to the right work locations. The conveyor belt allows biological tissue samples to be conveyed to their assigned work location at each work station. Even in the case of transport by means of a conveyor belt, the loading and unloading areas perform their function, as previously described. In the case of use of diverter devices within the work stations, these must be suitably set up, therefore, for the deviation of the single cassettes or single slides, or of the carriers intended for their containment, rather than the deviation of the capsules as described above. In the event that the main transport apparatus is made by means of a pneumatic pipe, the diverter device arranged at the work station served by a secondary transport apparatus of the belt type must provide for an appropriate interface able to unload the biological tissue sample from the main transport apparatus to the identified secondary transport apparatus, and vice versa. The interface will therefore transform the type of transport from pneumatic to belt, and vice versa. The portion of the conveyor belt interfaced with the aforementioned loading and unloading areas is provided with an identification system having the function of identifying the biological tissue sample positioned by the handling device at the loading or unloading point. For example, the identification of the biological tissue sample can be performed by means of a barcode or QR code reading device, such code being arranged on the label of the container, or printed on the container itself where the biological tissue sample is housed.

Even in this case further details, as well as the description of the operation, will be described only according to some elements, repeatable within each work station, and what is described for the previous embodiments is applicable mutatis mutandis.

Resuming the work steps described above, in the "check-in step" the suitably prepared cassettes are identified and then positioned on the bidirectional belt, without the aid of any carrier, automatically or manually. At the sending/receiving station, a loading/unloading station converts the handling on the belt into a pneumatic handling, loading one or more cassettes within the related capsules.

If the samples require the "reduction step", the containers entering the handling system are identified and later distributed among the work locations of the reduction station by means of the secondary transport apparatus intended for serving such station, i.e. by means of the bidirectional conveyor belt. The positioning on the conveyor belt can be carried out manually or by means of an automated aid, such as a pick-and-place system. Each container can include one or more biological tissue samples taken from the same patient for a specific analysis, identifying these samples within the anatomical pathology laboratory with a unique case report identifier. The distribution of the containers to the various work locations takes place, in this case, by subdivision of case reports, i.e. all the containers of biological tissue samples belonging to the same patient arrive at each location. Different subdivision methods may be necessary and fall within the inventive concept of the present invention. Each biological tissue sample is, therefore, sectioned and reduced and the cassettes for each biological sample are prepared.

When the capsule arrives at the processing station, it is opened automatically and the cassettes are placed, by hand or by means of a pick-and-place system, on a new bidirectional belt for a new identification. At the end of the "processing step", the processed cassettes are positioned again on the bidirectional belt, identified and inserted manually or automatically into the capsule intended to reach the next work station via the pneumatic pipe.

The further step, up to the output station, are similar to what is described in the previous embodiments, taking into consideration the constraints of the conveyor handling in a similar way to what has already been described in the examples related to the conveyor handling of the "check-in step" and of the "processing step".

The innovative aspect of the invention is therefore determined by the creation of an anatomical pathology laboratory equipped with an innovative handling system. The dense branching that can be given to such handling system, being by means of pneumatic pipes or conveyor belt lanes, enables it to make connections that reach almost every point of the aforementioned laboratory. These connections can be of the "point to point" type along a unique and predefined path, but also, if necessary, connections of the "many points to many points" type, as well as "one to many" and "many to one", to allow maximum flexibility in the use of the instruments present in the laboratory. All this leads to a parallelization of homogeneous operations on multiple work locations within the same work station of the anatomical pathology laboratory.

In addition, the traceability of the samples is maintained at all the transport steps of the biological tissue sample. In particular, traceability can be managed right from the sampling point, when the handling system is provided with the input station at such sampling point. The aforementioned traceability is then obviously preserved even later by identifying the capsules that travel in the pneumatic mail tubes, or the carriers that travel on the lanes provided with conveyor belts, and which neatly handle within them cassettes and/or slides containing biological tissue samples. Similarly, traceability is preserved in the identification of individual cassettes or individual slides in the various work and/or transport steps.

Moreover, the handling system architecture is modular, being able to adapt according to the needs to different situations in terms, for example, of laboratory size, number of compartments and therefore of work stations and number of work locations which are present in each single work station. In this sense, the handling system according to the present invention is undoubtedly more flexible and open than known solutions.

Following an initial examination step, the pathologist may assess the need to request further tests. Following the iterations of additional tests and procedures with respect to the defined work protocol, the pathologist repeats the microscopic examination process, and can then request further tests iteratively until a final result is achieved. The further tests may involve further trials on biological tissue samples previously analyzed or partially subject to the steps of the work protocol. For example, the pathologist may request the implementation of a different staining protocol. In this case a new slide, to which the required staining protocol is applied, is further obtained from the existing biological tissue sample (or this slide can simply be retrieved from the warehouse).

The use of a modular and optimization approach allows the tissue sample to be routed to the first available work location, or to the work location intended for carrying out a particular protocol. This approach is extended to the entire handling system, allowing to prevent any possible bottleneck.

The use of a handling system including a main transport apparatus and a plurality of secondary transport apparatuses of the pneumatic type also allows to manage all the samples in transit in a traceable and complete manner, minimizing the impact on the layout of the laboratory itself. In particular, the use of pneumatic structures allows to compensate for the rigid nature of belt transport, in which the displacement of the instruments would involve significant changes to the layout of the handling system. As a result, it is possible to remap the location of instruments in the individual work locations or the arrangement of a work station on the basis of future provisions and updates.

What is claimed is:

1. A system for handling biological tissue samples through a plurality of work stations of an anatomical pathology laboratory, wherein each biological tissue sample is associated with a unique code that identifies the biological tissue sample and is indicative of a work protocol, comprising a succession of steps of an anatomical pathology process, to be carried out on the biological tissue sample, said biological tissue handling system comprising:

an input station for entering said biological tissue samples into said biological tissue handling system;

the plurality of work stations for processing said biological tissue samples; and an output station for an exit of said biological tissue samples from said biological tissue handling system;

control means, comprising one or more electronic controllers configured to manage handling of said biological tissue samples in said work stations according to the work protocol associated with said biological tissue samples, at least one of said work stations comprises a plurality of independent work locations, one or more transport apparatuses comprising a network of pipes operatively connected to said input station, to said output station, to said work stations and to said plurality of independent work locations, and configured to move bidirectionally said biological tissue sample carried by a capsule within the network of pipes to said input station, to said output station, to said work stations and to said plurality of independent work locations;

said one or more electronic controllers are configured for controlling said one or more transport apparatuses so as to manage, by means of said one or more transport apparatuses, a routing and handling of said biological tissue samples in said work stations according to the work protocol associated with said biological tissue samples, said one or more transport apparatuses defining a path through said work stations for each of said biological tissue samples, said one or more electronic controllers are also configured for controlling said one or more transport apparatuses so as to manage, by means of said one or more transport apparatuses, a routing and handling of said biological tissue samples in and among said plurality of independent work locations according to a workload of said plurality of independent work locations and to the work protocol associated with said biological tissue samples identifying one of said plurality of independent work locations for each biological tissue sample, said one or more electronic controllers are configured for controlling said one or more transport apparatuses so as to move forward, by means of said one or more transport apparatuses, each biological tissue sample along said defined path, through said work stations, when a subsequent work station in said defined path is free to process said biological tissue sample, wherein said one or more electronic controllers are configured for controlling said one or more transport apparatuses so as to move forward said biological tissue sample to an identified work location of said plurality of independent when the identified work location is free to process said biological tissue sample, and wherein said one or more transport apparatuses comprise:

a main transport apparatus comprising a main pneumatic pipe system of the network of pipes and operatively connected to said input station, to said output station and to said work stations and configured to move bidirectionally said biological tissue samples carried within the capsule to said input station, to said output station and to said work stations, and a plurality of secondary transport apparatuses each comprising a secondary pneumatic pipe system of the network of pipes and operatively connected to said main pneumatic pipe system and each respectively operatively connected to said plurality of independent work locations of one single work station of said work stations, said secondary pneumatic pipe system being configured to move bidirectionally said biological tissue samples carried in said capsule to said plurality of independent work locations of said one single work station and to said main pneumatic pipe system.

2. The system for handling biological tissue samples according to claim 1, wherein said one or more electronic controllers comprise a central control unit and/or a plurality of secondary control units arranged respectively at said input station, at said one or more transport apparatuses and at said output station and/or a plurality of secondary control units arranged respectively at said input station, at each of said plurality of independent work locations and at said output station.

3. The system for handling biological tissue samples according to claim 1, wherein said main pneumatic pipe system of said main transport apparatus configured to directly connect in a bidirectional way said input station and said output station, and a plurality of diverter devices arranged on said main transport apparatus at each of said secondary transport apparatuses, said diverter devices being configured to indirectly connect said work stations to said main transport apparatus.

4. The system for handling biological tissue samples according to claim 1, wherein said main pneumatic pipe system of said main transport apparatus comprises a plurality of separate pipes arranged in succession from said input station to said output station, wherein each separate pipe of the plurality of separate pipes is configured to connect two successive work stations, and a plurality of diverter devices arranged between two successive separate pipes and configured to directly connect in a bidirectional way the two successive separate pipes and indirectly one of the work stations arranged between said two successive separate pipes.

5. The system for handling biological tissue samples according to claim 1, wherein said biological tissue samples are moved to said plurality of independent work locations of one of said work stations via said capsule within one or more pneumatic pipes of the secondary pneumatic pipe system.

6. The system for handling biological tissue samples according to claim 5, wherein said secondary pneumatic pipe system of said secondary transport apparatuses each comprise one pneumatic pipe and a plurality of diverter devices arranged on said one pneumatic pipe at each of said plurality of independent work locations and configured to directly connect in a bidirectional way said plurality of independent work locations of one of said work stations to the secondary transport apparatus and indirectly to said main transport apparatus.

7. The system for handling biological tissue samples according to claim 5, wherein said secondary pneumatic pipe system of said secondary transport apparatus comprises a plurality of separate pneumatic pipes departing from said main pneumatic pipe system of said main transport apparatus towards each of said work stations and a diverter device arranged at said main pneumatic pipe system, said plurality of separate pneumatic pipes and said diverter device being configured to directly connect in a bidirectional way each of said plurality of independent work locations of one of said work stations to said main pneumatic pipe system.

8. The system for handling biological tissue samples according to claim 1, wherein said main pneumatic pipe system of said main transport apparatus is further operatively connected to one or more sampling points of said biological tissue samples and said control arrangement is operatively connected to an initialization apparatus of said biological tissue sample arranged at each of said one or more sampling points, said initialization apparatus configured to generate the unique code of said biological tissue sample collected and inserted into said capsule in said main pneumatic pipe system.

9. The system for handling biological tissue samples according to claim 8, wherein said input station comprises one or more input locations arranged at said one or more sampling points to define a connection of said main pneumatic pipe system of said main transport apparatus with said one or more sampling points, each of said input locations including one or more of said initialization apparatuses.

10. The system for handling biological tissue samples according to claim 1, wherein said main pneumatic pipe system of said main transport apparatus is further operatively connected to one or more storage locations of said biological tissue samples and said control arrangement is operatively connected to an identification apparatus arranged at each of said one or more storage locations, said identification apparatus is configured to identify said unique code of said biological tissue sample retrieved from said one or more storage locations and inserted in said main pneumatic pipe system.

11. The system for handling biological tissue samples according to claim 10, wherein said output station comprises one or more buffer locations configured to group together biological tissue samples to be sent to said one or more storage locations.

12. The system for handling biological tissue samples according to claim 1, comprising a plurality of sensors arranged at each work station of said plurality of work stations and/or at each work location of said plurality of independent work locations and configured to identify biological tissue samples arriving at, departing from, or passing through the work stations of the plurality of work stations and/or the plurality of independent work locations, by means of the respective unique codes, and to communicate information contained in said unique codes to said one or more electronic controllers.

13. An anatomical pathology laboratory comprising at least a processing station, a microtomy station, a staining station and a microscopic analysis station, wherein at least one of said stations is provided with the plurality of independent work locations, said anatomical pathology laboratory comprises the system for handling biological tissue samples according to claim 1.

14. The system for handling biological tissue samples according to claim 1, wherein at least one of the steps of the anatomical pathology process is configured to be carried out by one or more human operators positioned within at least one of the work stations within the anatomical pathology laboratory; and wherein at least one work location of the plurality of independent work locations is configured to be operated by the one or more human operators positioned within the at least one work location.

15. A process for handling biological tissue samples through a plurality of work stations of an anatomical pathology laboratory, wherein each biological tissue sample is associated with a unique code that identifies the biological tissue sample and is indicative of a work protocol, comprising a succession of steps of an anatomical pathology process, to be carried out on the biological tissue sample, in which at least one of said work stations comprises a plurality of independent work locations, and in which an input station of said biological tissue samples and an output station of said biological tissue samples are further provided, said process further comprises: moving said biological tissue samples by means of one or more transport apparatuses comprising a network of pneumatic pipes operatively connected to said input station, to said output station, to said work stations and to said plurality of independent work locations, said one or more transport apparatuses being configured to move bidirectionally said biological tissue samples carried by a capsule within the network of pneumatic pipes to said input station, to said output station, to said work stations and to said plurality of independent work locations; and controlling said one or more transport apparatuses, by means of one or more electronic controllers to manage, by means of said one or more transport apparatuses, a routing and handling of said biological tissue samples in said work stations according to the work protocol associated with said biological tissue samples, defining a path through said work stations for each of said biological tissue samples and to manage, by means of said one or more transport apparatuses, a routing and handling of said biological tissue samples in said plurality of independent work locations according to a workload of said plurality of independent work locations and to the work protocol associated with said biological tissues samples identifying one of said plurality of independent work locations for each biological tissue sample, wherein said one or more transport apparatuses are controlled, by means of said one or more electronic controllers, to move forward each biological tissue sample along said defined path, through said work stations, when a subsequent work station in said defined path is free to process said biological tissue sample and to move forward said biological tissue sample to one identified work location of the plurality of independent work locations when the one identified work location is free to process said biological tissue sample,—wherein said one or more transport apparatuses comprise:—a main transport apparatus comprising a main pneumatic pipe system of the network of pneumatic pipes and operatively connected to said input station, to said output station and to said work stations and configured to move bidirectionally said biological tissue samples carried within a capsule to said input station, to said output station and to said work stations; and—a plurality of secondary transport apparatuses each comprising a secondary pneumatic pipe system of the network of pneumatic pipes and operatively connected to said main pneumatic pipe system and each respectively operatively connected to said plurality of independent work locations of one single work station of said work stations, said secondary pneumatic pipe system being configured to move bidirectionally said biological tissue samples carried in said capsule to said plurality of independent work locations of said one single work station and to said main pneumatic pipe system.

16. The process for handling biological tissue samples according to claim 15, wherein at least one of the steps of the anatomical pathology process is configured to be carried out by one or more human operators positioned within at least one of the work stations and at least one of the plurality of independent work locations of the anatomical pathology laboratory.

* * * * *